US012347429B2

(12) United States Patent
Sharifi et al.

(10) Patent No.: US 12,347,429 B2
(45) Date of Patent: Jul. 1, 2025

(54) SPECIFYING PREFERRED INFORMATION SOURCES TO AN ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 486 days.

(21) Appl. No.: 17/548,074

(22) Filed: Dec. 10, 2021

(65) Prior Publication Data

US 2023/0186908 A1 Jun. 15, 2023

(51) Int. Cl.
| | |
|---|---|
| *G10L 15/22* | (2006.01) |
| *G06F 16/2455* | (2019.01) |
| *G06F 16/2457* | (2019.01) |
| *G10L 15/06* | (2013.01) |
| *G10L 15/08* | (2006.01) |
| *G10L 15/18* | (2013.01) |

(52) U.S. Cl.
CPC ........ *G10L 15/22* (2013.01); *G06F 16/24564* (2019.01); *G06F 16/24578* (2019.01); *G10L 15/063* (2013.01); *G10L 15/1815* (2013.01); *G10L 2015/081* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 10,481,861 B2 | 11/2019 | Kogan et al. | |
| 2006/0026147 A1* | 2/2006 | Cone | G06F 16/9538 |
| 2019/0325079 A1* | 10/2019 | Blake | G06F 16/3328 |
| 2020/0175046 A1* | 6/2020 | Wang | G06F 16/358 |
| 2020/0196021 A1* | 6/2020 | Vassigh | G10L 15/22 |
| 2020/0334369 A1* | 10/2020 | Koch | G06N 5/02 |

* cited by examiner

*Primary Examiner* — Nicole A K Schmieder
(74) *Attorney, Agent, or Firm* — Gray Ice Higdon

(57) ABSTRACT

Implementations relate to interactions between a user and an automated assistant during a dialog between the user and the automated assistant. Some implementations relate to processing received user request input to determine that it is of a particular type that is associated with a source parameter rule and, in response, causing one or more sources indicated as preferred by the source parameter rule and one or more additional sources not indicated by the source parameter rule to be searched based on the user request input. Further, those implementations relate to identifying search results of the search(es), and generating, in dependence on the search results, a response to the user request that includes content from search result(s) of the preferred source(s) and/or content from search result(s) of the additional source(s). Generating the response further includes including, in the response, some indication that indicates whether the source parameter rule was followed or violated in generating the response.

18 Claims, 8 Drawing Sheets

SPECIFYING PREFERRED INFORMATION SOURCES TO AN ASSISTANT

BACKGROUND

Automated assistants (also known as "personal assistant modules", "mobile assistants", or "chat bots") may be interacted with by a user via a variety of computing devices, such as smart phones, tablet computers, automobile systems, standalone personal assistant devices, and so forth. The automated assistants receive textual input from the user (e.g., typed and/or spoken) and respond with responsive output (e.g., visual and/or audible).

Some user interactions with an automated assistant may solicit only a single response from the automated assistant. For example, inputs (e.g., spoken inputs) of "what time is it in London", "what is the Capital of Delaware", and "what's Theoretical College Team's current ranking" may all solicit a single response from the automated assistant. That single response is generated, by the automated assistant, utilizing source(s) that the automated assistant deems to be most appropriate. In situations where the user preferred that alternate source(s) had instead been utilized in generating the response, the user would need to reformulate their input to specify those source(s) and provide the reformulated input to the automated assistant. This prolongs the interaction between the user and the automated assistant and, further, requires utilization of automated assistant resources in processing the reformulated input. For example, responsive to a spoken utterance of "what's Theoretical College Team's current ranking", the automated assistant can generate a response that is from a resource that reflects only the team's ranking according to a first source. If the user instead preferred the team's ranking according to a second source, the user would need to provide another spoken utterance such as "what's Theoretical College Team's current ranking according to second source".

Other user interactions with an automated assistant may be more general and solicit that a group of responses be provided by the automated assistant. For example, inputs of "news headlines", "nearby restaurants", and "search results for mustang" may each solicit the automated assistant to issue a search of one or more corpora to identify a group of results that are responsive to the search. Further, the group of results are rendered (e.g., audibly and/or visually) to the user via an assistant device (i.e., a client device that implements (at least in part) the automated assistant) responsive to such an input. Due to the often constrained user interfaces of assistant devices, only a subset of the group of results may be rendered at a given time and an additional subset not rendered until further user input is received, the subset is rendered in its entirety, and/or an amount of time has passed. For example, some assistant devices include speakers, but lack any display. For a group of search results with such devices, each result is audibly rendered individually, and a next result not rendered until the current result is rendered in its entirety or further user input is received. As another example, some assistant devices may include a display, but it can be relatively small. For a group of search results with such devices, only a small subset can be visually rendered at a time. In the many situations where the initially rendered subset does not include result(s) from preferred source(s) of the user, rendering of additional subset(s) will be required. This prolongs the interaction between the user and the automated assistant, and utilizes further automated assistant resources in rendering of additional subset(s).

Accordingly, in various situations computational and/or network resources can be wasted and/or user experience degraded when result(s) from the automated assistant are not from preferred source(s) of the user. Users can have preferences for certain sources due to their familiarity with those sources and their reputations, their known expertise or thoroughness on certain topics, etc. Additional and/or alternative drawbacks of these and/or other techniques may be presented.

SUMMARY

This specification is directed to methods, apparatus, and/or computer readable media related to interaction between a user and an automated assistant during a dialog between at least the user and the automated assistant. Some implementations are directed to generating and utilizing, by an automated assistant, source parameter rules that indicate which source(s) should be preferred in responding to various user requests. Some of those implementations can enable a user to request that a particular source or group of sources is preferred by the automated assistant in performing searches for certain types of user requests and/or in presenting results of searches performed based on certain types of user requests.

Some of these and other implementations of the specification can achieve various technical advantages. Some example implementations leverage an improved interaction protocol for an automated assistant to reduce computational resources used during interactions between the automated assistant and its user(s). For example, some implementations of adapting when and/or whether certain sources are searched and/or certain search results are provided to the user can enable fewer searches to be performed (e.g., based on fewer user requests being issued to obtain the desired information) and/or fewer results to be provided to the user in some situations, while still satisfying the informational needs of the user. This can reduce the use of various computational resources, such as resources of a computing device that are required for capturing the user request inputs provided by the user and visually and/or audibly presenting the search results to the user. Also, for example, some implementations described herein include various answer parameters defining which source parameter rules and/or sources to utilize for a user request if the content of a preferred source associated with a given source parameter rule fails to satisfy the informational requirements of the user request. Thus, if additional or follow-up searches are indeed determined to be necessary, they may be more targeted, thus saving computational resources required for searching any additional sources or performing any additional or follow-up searches.

As one example, a user can cause user request input to be provided to an automated assistant during a dialog between the user and the automated assistant. The user request input can initiate the dialog or can be a continuation of a previously initiated dialog. The user request input can be natural language free-form input, such as user request input that is based on user interface input generated by the user via one or more user interface input devices (e.g., based on textual input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

In response to user request input provided to the automated assistant as part of a dialog, the automated assistant can determine a "request type" and/or other classification(s) of the user request and identify a source parameter rule indicating which sources are preferred by the user for responses to user requests of the determined classification(s). For example, in determining the request type, the automated assistant can determine the request type based on determining that the request type corresponds to an intent of the user request, to a topic associated with the user request, and/or to other parameter(s) of the user request. The automated assistant can cause a search of one or more of the preferred sources indicated by the corresponding source parameter rule to be issued based on the user request input (or can itself search the database(s)), and can obtain a plurality of preferred search results, from the preferred source(s), in response to the search.

As one example, in response to user request input of "news headlines", the automated assistant can determine that the user and/or the client device of the user is associated with a source parameter rule that defines that "Source A" is a preferred source for "news" type requests, can cause "Source A" to be searched based on the user request, and can obtain one or more preferred search results identified in response to the search. For instance, the automated assistant can cause "Source A" to be searched by (a) submitting a query, that is based on the user request, to a search engine that is specific to "Source A" and/or by (b) formulating a query that is based on the user request and that includes a restriction to "Source A" (e.g., includes "site:SourceA" or other restriction(s)) and submitting the formulated query with restriction to a general search engine.

In some implementations, one or more additional sources can also be searched based on the user request to obtain one or more additional search results. The additional source(s) are source(s) not indicated by the source parameter rule determined to correspond to the user request. For example, the automated assistant can cause a general web search to be performed based on the user request, and/or may search one or more sources associated with different source parameter rules. In some versions of those implementations, the searching of the additional source(s) is selective in that the additional source(s) are only searched in response to determining that the preferred search result(s) fail to satisfy one or more criteria. For example, the additional source(s) can be searched only responsive to determining that (a) no preferred search result(s) are available or (b) that content, corresponding to one or more preferred search result(s) (e.g., at least a top ranked search result) fails to satisfy one or more quality criteria, such as popularity of the content, a degree of matching between the search parameter(s) (used in the search of "Source A") and the content, a last updated date of the content, and/or other quality criterion or criteria. In some of those versions, when the preferred search result(s) satisfy the one or more criteria, the preferred search result(s) can be rendered responsive to the user request (optionally along with an indication they are being provided based on a source parameter rule), and without performing any searching of the additional source(s). In these and other manners, computational and/or network resources can be preserved through only selectively searching the additional source(s).

In situations where the additional source(s) are searched responsive to a user request, the obtained search results (preferred and additional) can be selected, ranked, and/or compared for use in generating a response to the user request. For example, they can be selected and/or ranked based on one or more quality criteria, such as popularity of the content, degree of matching between the search parameters and the content, degree of matching between the source parameter rule parameters and the sources associated with the content, degree of matching between the user request and the content, attributes of the user (e.g., a location of the user, a primary language of the user), historical user-assistant or user-device interaction data, and one or more other criteria determined based on comparing the content of the obtained results (e.g., determining which source is newer, more up-to-date, authoritative, available in a more output-friendly format, etc.).

In some implementations in which the additional source(s) are searched responsive to a user request, the additional source(s) that correspond to the obtained results of the search can be ranked instead of or in addition to ranking the corresponding obtained results. In such implementations, the additional source(s) that correspond to the obtained search results (or the top X ranked search results) may be ranked based on one or more factors that the automated assistant determines based on the source parameter rule. For example, the automated assistant may determine, based on the assistant interaction history of a plurality of users, that users who use the same particular source for the same or a similar user request type also tend to use another particular source for that user request type. The automated assistant may then rank this other particular additional source higher compared to others of the additional sources that do not exhibit this correlation, for this particular search. In some implementations, the ranks of the additional source(s) are then used in determining the ranks of the search results, and the automated assistant selects the content to present to the user based on the ranks of the search results, as described herein. In other implementations, the automated assistant can select the content to provide to the user based on the ranks of the sources or based on some combination of the ranks of the sources and the ranks of the corresponding search results (e.g., the top obtained search result that is associated with the top X ranked sources).

Regardless of the technique(s) for obtaining and/or selecting the search results, the automated assistant can provide one or more of the obtained search results for presentation (visual and/or audible) to the user as part of the dialog and as a response to the user request. The response presented to the user can include content from one or more of the obtained search results. In various implementations described herein, the response generated by the automated assistant based on the obtained search results and presented to the user can also include an indication as to whether a source parameter rule was followed (or not) for the user request, and/or to what degree the source parameter rule was followed. In some implementations, if a given source parameter rule is not followed for a corresponding user request, the automated assistant can additionally cause an audible and/or visual prompt to be presented to the user asking if they would like the automated assistant to modify the corresponding source parameter rule or create a new one.

As one particular example, the automated assistant can obtain a top ranked preferred search result and can also obtain a top ranked additional search result. Preferred content, corresponding to the top ranked preferred search result, can be compared to additional content of the top ranked additional search result. If the comparison indicates a threshold degree of similarity, then content of the top ranked preferred search result can be utilized in generating the response and without utilization of any of the additional search result(s). The generated response can optionally also include an indication that the top ranked preferred search result is being utilized based on it conforming to the source parameter rule. For instance, the generated response can be of the format "Your preferred source indicates [content from preferred source]". In these and other manners, the additional search result(s) are utilized to verify (via the comparison) the accuracy of the top ranked preferred search result, but the additional search result(s) are not utilized in generating the response if the accuracy is verified. In these and other manners, the response can be more concise (by omitting content from the additional search result(s)), while still ensuring the response (generated based on content from the preferred search result(s)) is accurate. Ensuring the response is accurate can mitigate occurrences of further utilization of computational resources on the basis of inaccurate information and/or can ensure that informational needs of the user are met, which can prevent further follow-up queries to the automated assistant that seek to fulfill the unmet informational needs.

In some implementations, if the comparison instead indicates a threshold degree of dissimilarity, then content of the top ranked preferred search result can be utilized in generating the response, but content of the additional search result(s) (e.g., the top ranked additional search result) can also be utilized in generating the response. The generated response can optionally also include an indication that content of the top ranked preferred search result differs from content of the additional search result(s). For instance, the generated response can be of the format "Your preferred source indicates [content from preferred source]. However, note that this conflicts with other source(s) that indicate [conflicting content from additional source(s)]". Selectively including content from the additional search result(s) can ensure that at least part of the response is accurate and/or that informational needs of the user are met. Also, including content from the preferred source(s) can ensure the source parameter rule is followed and/or can prevent the user from issuing a follow-up request that is specifically directed to the preferred source(s) (which causes further processing of the follow-up request).

In some implementations, if the comparison indicates a threshold degree of dissimilarity (e.g., optionally a threshold that indicates more dissimilarity than that of the immediately prior paragraph), then content of one or more of the additional search result(s) (e.g., the top ranked additional search result) can be utilized in generating the response and without utilization of any of the preferred search result(s). The generated response can optionally also include an indication that response violates the source parameter rule and, optionally, why the response violates the source parameter rule. For instance, the generated response can be of the format "An alternate source indicates [content from additional source(s)]. Your preferred source was not utilized as it appears to be inaccurate for this request". Selectively including content from the additional search result(s) can ensure that at least part of the response is accurate and/or that informational needs of the user are met. Also, including an indication as to why the source parameter rule was violated can prevent the user from issuing a follow-up request that is specifically directed to the preferred source(s) (which causes further processing of the follow-up request).

As another particular example, the automated assistant can determine no preferred search result(s) are available from the preferred source(s), but can obtain additional search result(s) from additional source(s). Content of one or more of the additional search result(s) (e.g., the top ranked additional search result) can be utilized in generating the response. The generated response can optionally also include an indication that response violates the source parameter rule and, optionally, why the response violates the source parameter rule. For instance, the generated response can be of the format "An alternate source indicates [content from additional source(s)]. Your preferred source was not utilized as it does not have an answer for this request". Selectively including content from the additional search result(s) can ensure that at least part of the response is accurate and/or that informational needs of the user are met. Also, including an indication as to why the source parameter rule was violated can prevent the user from issuing a follow-up request that is specifically directed to the preferred source(s) (which causes further processing of the follow-up request).

Source parameter rules can be created by the automated assistant based on explicit request of the user, or based on historical interaction data of the user. For example, the user can request creation of a source parameter rule by providing the request, "From now on, please use 'Source A' for 'news'". As another example, the automated assistant can automatically generate a source parameter rule based on the historical assistant or device interaction data of the user indicating that the user most frequently specifies "Source A" when including a source preference in a request for "news" information. As yet another example, a source parameter rule may be automatically generated by the automated assistant based on determining that the user commonly interacts with search results from "news"-type search queries that are associated with "Source A".

In some implementations, the source parameter rules can be created based on a "type" of source indicated by a user request and/or by the user's historical interaction data. For example, the user may provide the request "I'd prefer UK election news from British news sources." The automated assistant can then include an indication of or pointer to a collection of British news sources in a source parameter rule for "UK election news" type requests. Additionally or alternatively, the automated assistant may determine to create such a rule based on the historical interaction data of the user indicating that the user typically or always interacts with British news sources when seeking information on "UK election news". In such implementations, the automated assistant can determine which sources are "British news sources" using various approaches such as heuristics or creating a knowledge graph containing machine-learning generated embeddings of content from various sources (or "news sources", for example) such that the knowledge graph groups the embeddings together based on "type" (e.g., "British" news sources will be closer to one another than to "American" news sources in the embedding space(s)).

In some implementations, a method performed by one or more processors is provided that includes receiving user request input, obtaining one or more search results that are responsive to the input, and presenting responsive content obtained from the one or more search results to the user. The user request input is based on user interface input generated by a user via a user interface input device, and the user interface input is generated by the user as part of dialog between the user and an automated assistant implemented at least in part by one or more of the processors. If the user request input is received in audible form, then a transcription of the audible user request input may be generated based on processing the audible user request input. A particular type of request that is associated with a source parameter rule is determined based on processing the user request input or the transcription of such, where the source parameter rule defines one or more preferred sources to be used in responding to the particular type of request. The one or more search results can be obtained based on causing a first search of the one or more preferred sources to be performed based on the user request input and causing a second search of a plurality of additional sources to be performed based on the user request input, the plurality of additional sources not being included in the one or more preferred sources. The first content of one or more preferred results obtained based on the first search of the one or more preferred sources can be compared to second content obtained based on the second search of the plurality of additional sources. Based on the comparison indicating at least a threshold degree of dissimilarity between the first content of the one or more preferred results and the second content of the one or more additional results, a response to the user request input can be generated to include at least some of the first content, at least some of the second content, and an indication that the first content obtained from one or more of the preferred sources indicated by the source parameter rule differs from the second content corresponding to one or more of the additional sources not indicated by the source parameter rule. The one or more processors then cause the response to the user request input to be rendered at the client device of the user.

In some implementations, the one or more additional sources may not be searched based on the user request unless it is determined that no answer is available from the one or more preferred sources indicated by the source parameter rule. In such implementations, the generated response may include content only from one or more of the additional sources, and may further include an indication that the source parameter rule was violated for the user request based on no content being available from the one or more preferred sources indicated by the source parameter rule. In some implementations, only one search may be performed, and the search may be of a plurality of sources including both preferred source(s) and additional source(s).

In some implementations, the response may be generated based on only content associated with the preferred source(s) or based on only content associated with the additional sources. In such implementations, when the only search result(s) used in generating the response are associated with the preferred source(s), the response may be generated to include an indication that the search result(s) were selected for providing the response to the user request based on the source parameter rule. When the only search result(s) used in generating the response are associated with the additional source(s), the response may be generated to include an indication that the source parameter rule was violated.

In some implementations, selecting the search result(s) associated with the preferred source(s) or associated with the additional source(s) may be performed based on ranking the search results and selecting one or more of the search results for generating the response based on the ranking, instead of or in addition to selecting based on comparisons between content of the search results.

These and other implementations of technology disclosed herein may optionally include one or more of the following features.

In some implementations, the source parameter rule is generated based on a previous audible request indicating the particular type of request and the one or more preferred sources to be used in responding to the particular type of request.

In some implementations, determining that the user request input corresponds to the particular type of request that is associated with the source parameter rule that is specific to the user and/or to the client device includes performing natural language processing on the user request input (and/or a transcription of such) to determine an intent of the user request and determining, based on the intent of the user request being stored in association with the particular type of request, that the user request corresponds to the particular type of request that is associated with the source parameter rule that is specific to the user and/or the client device. In some such implementations, this determination process further includes determining an entity associated with the intent of the user request and determining, based on the intent and the entity both being stored in association with the particular type of request, that the user request corresponds to the particular type of request that is associated with the source parameter rule that is specific to the user and/or the client device.

In some implementations, the method further includes processing audible user request input using at least one voice recognition technique, to identify an account associated with the user who spoke the audible request. In some such implementations, determining that the audible user request input corresponds to the particular type of request that is associated with the source parameter rule that is specific to the user comprises identifying, based at least in part on a transcription of the audible user request input, an entity associated with the user request, identifying a plurality of source parameter rules associated with the account of the user and the entity, and selecting the source parameter rule, from a plurality of candidate source parameter rules associated with the user, based on one or more answer parameters associated with the account of the user.

In some implementations, before the user request input is received, a machine learning model is trained based on training examples generated based on the source parameter rule. In such implementations, determining that the user request input corresponds to the particular type of request indicated by the source parameter rule can include processing one or more features of the received user request input using the machine learning model to generate output, and determining, based on the output, that the user request input corresponds to the particular type of request indicated by the source parameter rule.

In some implementations, comparing first content of one or more preferred results obtained based on the first search of the one or more preferred sources to second content obtained based on the second search of the plurality of additional sources includes comparing first content of one or more preferred results obtained based on the first search of the one or more preferred sources to second content of a top ranked search result obtained based on the second search of the plurality of additional sources.

In some implementations, determining that no answer is available from the one or more preferred sources for responding to the user request includes determining that content of one or more results determined based on the first search of the one or more preferred sources fails to satisfy one or more quality criteria. In some such implementations, causing the second search to be performed may be performed responsive to determining that no answer is available from the one or more preferred sources.

In addition, some implementations include one or more processors of one or more computing devices, where the one or more processors are operable to execute instructions stored in associated memory, and where the instructions are configured to cause performance of any of the methods disclosed herein. Some implementations also include one or more non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

According to some aspects of the present disclosure, source parameter rules defining parameters for sources used in fulfilling certain types of user requests can be generated based on user preferences. Examples of user preferences include preferences that allow the user to specify which sources of content to search and the format of the content to be searched (e.g., online streaming content, articles, informative blurbs or summaries of podcasts provided by a particular podcast app, etc.). Users can request the creation of source parameter rules, or source parameter rules can be generated on their behalf based on historical patterns of user-specified source parameter usage across multiple similar user requests. The source parameter rules can be stored in the system (client and/or server side) and used in fulfilling later user requests.

For instance, a user may request "use XYZ News when I ask about the weather". Later, the user may ask "when is the rain supposed to start?" and one or more sources corresponding to XYZ News may be searched for the answer. In some implementations, other sources may be searched as well, based on other potentially applicable source parameter rules (e.g., if the user has also requested "include recent flash flooding weather alerts from the National Weather Service when I ask about the weather"). In some implementations, sources other than those defined by the source parameter rule(s) applicable to a given request may be searched to determine if the user should be alerted that another source has more up-to-date, detailed, or authoritative information responsive to the request. In some implementations, sources other than those defined by the source parameter rule(s) applicable to a given request may be searched if the source(s) defined by a given source parameter rule do not include the requested information.

Figure 1:
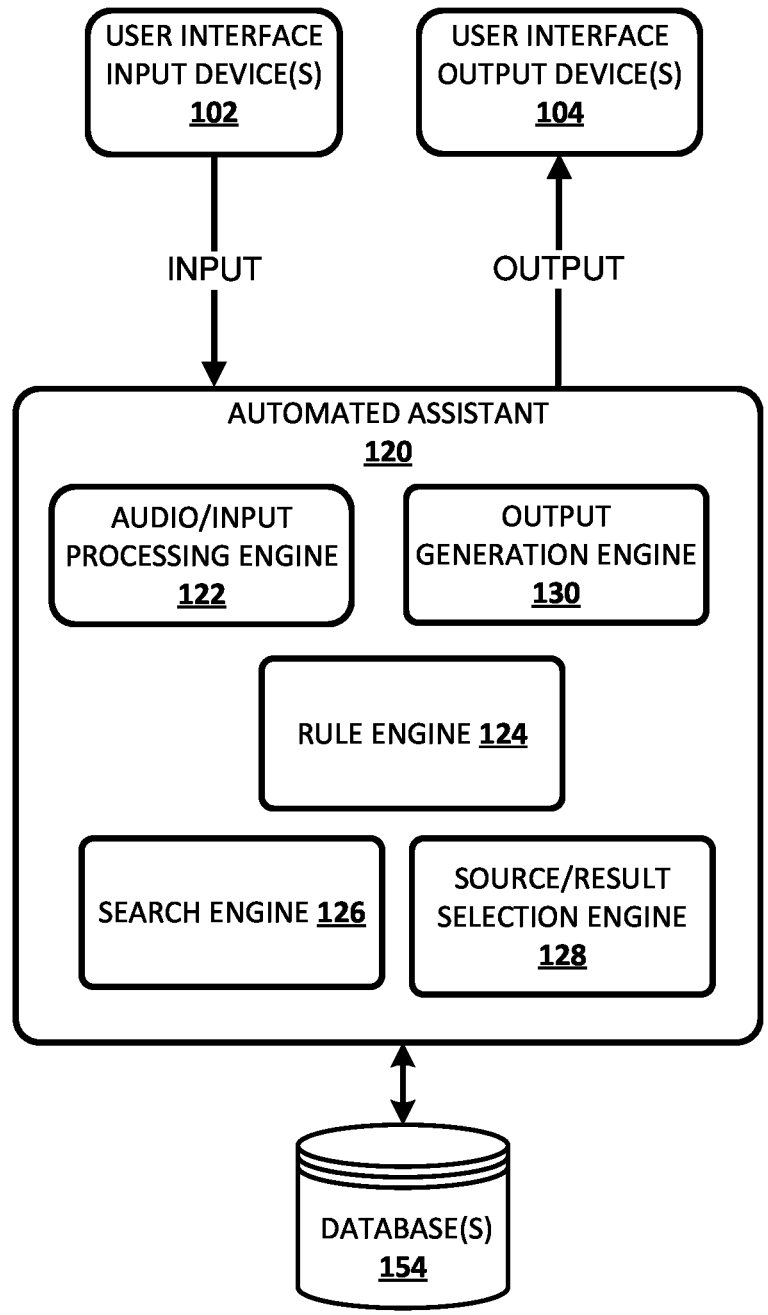
FIG. 1 is a block diagram of an example environment in which implementations disclosed herein may be implemented.

In FIG. 1, an example environment in which techniques disclosed herein may be implemented is illustrated. The example environment includes one or more user interface input devices 102, one or more user interface output devices 104, and an automated assistant 120. The user interface input devices 102 may include, for example, a physical keyboard, a touch screen (e.g., implementing a virtual keyboard or other textual input mechanism), and/or a microphone. The user interface output devices 104 may include, for example, a display screen, and/or speaker(s). The user interface input and output devices 102, 104 may be incorporated on one or more computing devices of a user. For example, a mobile phone of the user may include the user interface input and output devices 102, 104; or a standalone personal assistant hardware device may include the user interface input and output devices 102, 104; or a first computing device may include the user interface input device(s) 102 and a separate computing device may include the user interface output device(s) 104; etc.

A client computing device may optionally operate one or more applications that enable dialog with the automated assistant 120. Such applications may come in various forms such as a short messaging service ("SMS") and/or multimedia messaging service ("MMS") client, an online chat client (e.g., instant messenger, Internet relay chat, or "IRC," etc.), a messaging application associated with a social network, an automated assistant messaging service dedicated to conversations with automated assistant 120, and so forth. In some implementations, one or more of the applications may be implemented via a webpage or other resources rendered by a web browser or other application of a client computing device.

Although automated assistant 120 is illustrated in FIG. 1 as separate from the user interface output and input devices 102, 104, in some implementations all or aspects of the automated assistant 120 may be implemented on a computing device that also contains the user interface input device(s) 102 and/or the user interface output device(s) 104. For example, all or aspects of output generation engine 130 and/or audio/input processing engine 122 of automated assistant 120 may be implemented on the computing device. In some implementations, all or aspects of the automated assistant 120 may be implemented on computing device(s) that are separate and remote from a computing device that contains the user interface input devices 102 and/or the user interface output devices 104 (e.g., all or aspects may be implemented "in the cloud"). In some of those implementations, those aspects of automated assistant 120 may communicate with the computing device via one or more networks such as a local area network (LAN) and/or wide area network (WAN) (e.g., the Internet).

Some non-limiting examples of client computing device(s) that may include the user interface input device(s) 102 and/or user interface output device(s) 104 include one or more of: a desktop computing device, a laptop computing device, a standalone hardware device at least in part dedicated to automated assistance, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device).

Additional and/or alternative client computing devices may be provided. In some implementations, a given user may communicate with all or aspects of automated assistant 120 utilizing a plurality of client computing devices that collectively form a coordinated "ecosystem" of computing devices. However, for the sake of brevity, some examples described in this disclosure will focus on the user operating a single client computing device.

A client computing device and automated assistant 120 may each (when they are separate devices) include one or more memories for storage of data and software applications, one or more processors for accessing data and executing applications, and other components that facilitate communication over a network. The operations performed by one or more of the client computing devices and/or by the automated assistant 120 may be distributed across multiple computing devices. Automated assistant 120 may be implemented as, for example, computer programs running on one or more computers in one or more locations that are coupled to each other through a network.

As illustrated in FIG. 1, a user provides input to the automated assistant 120 via the user interface input device(s) 102. The automated assistant 120 provides responsive output for presentation to the user via the user interface output devices(s) 104 (optionally after further processing by one or more components). For the sake of simplicity, the input is illustrated in FIG. 1 as being provided directly to the automated assistant 120 by the user interface input device(s) 102 and the output is illustrated as being provided by the automated assistant 120 directly to the user interface output device(s) 104. However, it is noted that in various implementations one or more intermediary hardware components may be functionally interposed between the automated assistant 120 and the user interface input and/or output devices 102, 104, and may optionally process the input and/or output. For example, one or more components may process the output provided by automated assistant 120 and generate, based on the processing of the output, one or more signals for presentation of search results and/or other content via the user interface output device(s) 104. For instance, where a user interface output device 104 is on a client computing device separate from all or aspects of the automated assistant 120, a hardware processor and/or other components may process the output and generate, based on the output, signals for driving the user interface output device 104.

In some implementations, the input received by the automated assistant 120 is already in a textual format. For example, the user interface input device(s) 102 may include a keyboard that generates textual input in response to user interface input directed to the keyboard, and the textual input provided to the automated assistant 120. Also, for example, the user interface input device(s) 102 may include a microphone, a voice-to-text processor that is separate from the automated assistant 120 may convert voice input received at the microphone into textual input, and the textual input may be provided to audio/input processing engine 122 of the automated assistant 120. In some such implementations, audio/input processing engine 122 of the automated assistant 120 may process the textual input to generate an annotated transcription of the user input that can be provided to one or more other components of the automated assistant.

In some other implementations, the input initially received by the automated assistant 120 is in an audio format, but is converted to a textual format by audio/input processing engine 122 of the automated assistant 120 and a transcription of the audio input is provided to one or more other components of the automated assistant 120. Audio input/processing engine 122 can process, using one or more speech recognition machine learning models (e.g., a recurrent neural network (RNN) model, a transformer model, and/or any other type of machine learning model capable of performing speech recognition) and one or more natural language understanding (NLU) machine learning models (e.g., a long short-term memory (LSTM), gated recurrent unit (GRU), and/or any other type of RNN or other machine learning model capable of performing NLU). These machine learning models can be locally stored on a client computing device (e.g., stored in one or more local database(s) 154) or shared machine learning models that are accessible to both client computing devices and/or remote systems (e.g., server(s)). The output generated by audio input/processing engine 122 can include, for example, annotated text corresponding to recognized speech. For example, audio input/processing engine 122 may process the audio input in order to generate recognized text as well as annotate various terms of the recognized text using knowledge graph data defining various parts of speech, grammar rules, and relationships between entity references.

In some implementations, audio input/processing engine 122 can use one or more of the machine learning models to process a stream of non-audio data in generating a transcript or annotated transcript of the audio data. The stream of non-audio data can include, for example, vision data provided by vision component(s) of the user interface input device(s) 102, touch inputs provided by a user via a touch-sensitive display of the user interface input device(s) 102, and any typed input provided by a user via a touch-sensitive display of the user interface input device(s) 102, and/or any other non-audio data. In some implementations, audio input/processing engine 122 may use one or more additional locally or remotely stored machine learning models in order to perform speaker identification (SID) to recognize a user (e.g., a corresponding user account) from their voice and/or to perform face identification (FID) to recognize a user (e.g., a corresponding user account) from vision data capturing his/her face.

When a user provides input requesting creation of a source parameter rule, audio/input processing engine 122 will generate a transcription of the user request and provide it to rule engine 124 of the automated assistant 120. Rule engine 124 will use one or more of machine learning models to determine the type of user request, including any predetermined topics or entities indicated by the request, and one or more parameters for sources used in performing searches for that type of user request.

In some implementations, rule engine 124 may additionally determine one or more answer parameters based on the user request. For example, if the user request is "I prefer to hear my news updates from CG Weekly News", then rule engine 124 may determine that CG Weekly News should receive priority when delivering responses to "news updates" requests, but that "news updates" from CG Weekly News should only be presented in lieu of relevant results from other sources when the content from CG Weekly News is among the top 5 search results. As another example, if the user request is "Always use CG Weekly News for my news updates", then rule engine 124 may determine that CG Weekly News should always be included in responses to "news updates" requests. In this example, if CG Weekly News has no "news updates" available or the automated assistant 120 determines the "news updates" are not relevant to the user (e.g., include out-of-date or otherwise inaccurate information), the automated assistant 120 may respond "Your preferred news updates source, CG Weekly News, doesn't have the most up-to-date information. Here's what (SOURCE #2) says is new today . . . " based on one or more answer parameters determined by rule engine 124 based on the language of the initial user request for creation of the source parameter rule for "news updates".

The rule parameters of the source parameter rule, including a user request type, any associated predetermined topics and/or entities, and one or more source parameters (and, in some implementations, one or more answer parameters) are then stored in one or more local or remote databases (not shown) accessible to rule engine 124 and/or one or more other components of automated assistant 120. In some implementations, the user is also able to request exclusion, or de-prioritization of certain sources in responses to particular types of user requests. For example, if the user request is "Never give me news updates from Ringo News Bulletin", then rule engine 124 may generate a source parameter rule indicating to never use content from Ringo News Bulletin in giving news updates, to only use content from Ringo News Bulletin for news updates if no other sources are available, to only use content from Ringo News Bulletin when it is the top ranked search result and no other top ranked search result is deemed as authoritative or trustworthy, etc.

In some implementations, the automated assistant 120 may generate source parameter rules on behalf of the user based on the user's historical interactions with the automated assistant 120. For example, if a user frequently asks the automated assistant 120 to play a "news update" routine, which includes news from Source 1, Source 2, and Source 3, and the user frequently asks the automated assistant to skip the portion of the news update routine from Source 1 and Source 2 once it begins playing, the automated assistant may generate a source parameter rule that dictates that "news" types of requests should only be answered using Source 3, should be answered using Source 3 when available, should not be answered using Source 1 or Source 2, should only be answered using Source 1 and/or Source 2 when the information or content is not available from Source 3, etc.

Subsequent to generation of a given source parameter rule by rule engine 124, user input including a request for information (and/or a transcript of such) can be processed by rule engine 124 to determine that the user input corresponds to the type of user request associated with the given source parameter rule.

One or more of the machine learning models accessible to audio input/processing engine 122, rule engine 124, and/or one or more other components of the automated assistant 120 can be trained based on training examples that are generated using existing source parameter rules and configured to process various features of an audible request input in order to generate output that indicates a focus of the user request, such as a user intent and/or entity associated with the user request. User intents associated with a given source parameter rule may be determined by one or more components of the automated assistant 120 when a given source parameter rule is created and then stored in association with one or more parameters, such as the "user request type", of the given source parameter rule. Entities relevant to a given source parameter rule (e.g., topics, locations, people, objects, etc.) may likewise be determined by one or more components of the automated assistant 120 when the given source parameter rule is created and stored in association with the rule. One or more components of the automated assistant 120, such as rule engine 124, may then use the output (e.g., indications of intents and/or entities) to determine or select which source parameter rule(s) should be applied (e.g., based on determining that a given entity/intent is associated with a user request type associated with a given source parameter rule). In implementations in which the automated assistant 120 performs some sort of identity verification processing on the user input to identify a user account associated with the user that provided the audible request input, the automated assistant 120 may determine that the audible user request is associated with a source parameter rule based on determining that the audible user request indicates a particular intent and/or a particular entity, and based on determining that the account of the user is associated with a given source parameter rule indicated as being associated with that particular intent and/or particular entity. The training examples generated based on the existing source parameter rules can include input features similar to or the same as one or more of the various rule parameters associated with a source parameter rule, as well as output features including an indication of whether a given source parameter rule applies to a user request that corresponds to those input features (e.g., a confidence level, a binary "0" or "1" decision, etc.).

Rule engine 124 can then provide an indication of the determined type of the user request and/or the various rule parameters of the associated source parameter rule to one or more other components of the automated assistant 120, such as search engine 126 or source/result selection engine 128. In other implementations, rule engine 124 may merely provide an indication of the associated source parameter rule, with a link, file path, or other pointer to a location where search engine 126 and/or source/result selection engine 128 can retrieve the rule parameters.

Search engine 126 of the automated assistant 120 receives a transcript of the user input from audio/input processing engine 122 and the type of request determined to correspond to the user request from rule engine 124. The transcript may include annotations of the user input, such as annotations indicating a user intent determined by one or more components of the automated assistant 120, such as audio/input processing engine 122. The type of request may indicate which resources search engine 126 should search (e.g., search of local applications, search of a particular database, general web search, etc.) and/or which type of content the user is requesting (e.g., information, interfacing with another service or application, video or image content, etc.).

Search engine 126 can use the transcript and type of request to formulate one or more search parameters such as search queries, locations or databases to be searched, search filters, etc. and perform one or more searches of one or more databases (e.g., search database 154) based on the search parameters. In some implementations, the search databases 154 include database(s) that index publicly available content and/or database(s) that index content that is private to the user. Search engine 126 may utilize the one or more databases (e.g., search database 154) to identify responsive content and may generate search results based on the identified responsive content. In some implementations, one or more of the search databases 154 may be remote from the automated assistant 120 and/or any separate client computing device, and/or one or more of the search databases 154 may be local to the automated assistant 120 and/or any separate client computing device. In this specification, the term "database" is used to refer to any collection of structured or unstructured data stored in one or more computer readable media.

Search engine 126 may utilize various techniques in searching the search databases 154 in response to textual input, such as conventional and/or other information retrieval techniques. In some implementations, the search engine 126 may search one or more of the databases 154 based on search parameter(s) that conform strictly to the textual input. For example, for textual input of "penguins", the only search parameter may be the term "penguins". In some implementations, search engine 126 may search one or more of the databases 154 based on one or more search parameters that are based on, but that do not necessarily conform strictly to, the textual input. For example, for textual input of "local news", the search engine 126 may search one or more of the databases 154 based on a search parameter that restricts the databases 154 to "news" databases and/or content to "news" content, and based on a search parameter that restricts content to content that is local to a user (e.g., "Colorado"). As another example, for textual input of "sporting goods stores nearby", the search engine 126 may search one or more of the databases 154 based on a search parameter that restricts the databases 154 to "points of interests" databases and/or content to "sporting goods" content, and based on a search parameter that restricts content to content that is within a threshold distance of a current location of the user. As yet another example, for textual input of "my photos", the search engine 126 may search one or more of the databases 154 based on a search parameter that restricts the databases 154 to databases that are personal to the user and/or content to "image" content.

The search results obtained by search engine 126 include search results corresponding to content that is responsive to the search(es) issued based on the search parameters. For example, each of the search results can include a title or other synopsis of a responsive content item, a summary of the content item, a link to the responsive content item, other information related to the responsive content item, and/or even the entirety of the content item. As one example, the summary of a news article content item may include a particular "snippet" or section of the news article. Also, for example, for a search result associated with an image, the search result may include a reduced size display of the image (e.g., "thumbnail" image), a title associated with the image, and/or a link to the image. Also, for example, for a search result associated with a video, the search result may include an image from the video (e.g., a "still frame" from the video), a segment of the video, a title of the video, and/or a link to the video. Search engine 126 can then pass the determined search parameters, as well as the results of the search or searches, to one or more other components of the automated assistant 120, such as source/result selection engine 128.

Source/result selection engine 128 receives the rule parameters of the corresponding source parameter rule, including the user request type, any associated predetermined topics and/or entities, and one or more source parameters (and, in some implementations, one or more answer parameters) from rule engine 124. Source/result selection engine 128 receives the results of the search or searches from search engine 126. In various implementations, source/result selection engine 128 also receives the transcript from audio/input processing engine 122 and/or the search parameters (e.g., search query or key terms, search filters, etc.) from search engine 126. Source/result selection engine 128 calculates scores for the content of the search results identified by search engine 126 using various quality criteria, such as popularity of the content, degree of matching between the search parameters and the content, degree of matching between the rule parameters and the sources associated with the content, degree of matching between the transcript of the user request and the content, attributes of the user (e.g., a location of the user, a primary language of the user), historical user-assistant or user-device interaction data, and one or more other criteria determined based on comparing the content of the obtained results (e.g., determining which source is more up-to-date, authoritative, available in a more output-friendly format, etc.). The source/result selection engine 128 can then rank the responsive content using the scores and select, based at least in part on the rankings, one or more results to present to the user responsive to the user request.

In some implementations, the source/result selection engine 128 may additionally or alternatively rank the sources that correspond to the obtained search results based on one or more quality criteria. For example, the source/result selection engine 128 may rank the preferred source highest based on it being indicated by the source parameter rule and then may rank the additional sources based on various factors such as: associations with similar source parameter rules and/or user request types for this user or for a plurality of users, popularity or frequency of use for this user or for a plurality of users, frequency with which a source is updated, and explicit or implicit feedback about a source received from this user or a plurality of users (e.g., if a plurality of users frequently submit a clarifying question after receiving content from a particular source, then the automated assistant may determine that the particular source's content is ambiguous or confusing). In these implementations, the ranks of the sources are then used in determining the ranks of the search results, and the automated assistant selects the content to present to the user based on the ranks of the search results, as described herein. In other implementations, the automated assistant can select the content to provide to the user based on the ranks of the sources or based on some combination of the ranks of the sources and the ranks of the corresponding search results (e.g., the top obtained search result that is associated with the top X ranked sources).

In some implementations, the source parameter rules can be created based on a "type" of source indicated by a user request and/or by the user's historical interaction data. For example, the user may provide the request "I'd prefer UK election news from British news sources." The automated assistant can then include an indication of or pointer to a collection of British news sources in a source parameter rule for "UK election news" type requests. Additionally or alternatively, the automated assistant may determine to create such a rule based on the historical interaction data of the user indicating that the user typically or always interacts with British news sources when seeking information on "UK election news". In such implementations, the automated assistant can determine which sources are "British news sources" using various approaches such as heuristics or creating a knowledge graph containing machine-learning generated embeddings of content from various sources (or "news sources", for example) such that the knowledge graph groups the embeddings together based on "type" (e.g., "British" news sources will be closer to one another than to "American" news sources in the embedding space(s)). In implementations in which the source parameter rules are based on a "type" of source, the rank of a given source or of the search results corresponding to the given source may be based at least in part on the degree of "matching" between the source type indicated by the source parameter rule and the "type" of the given source. For example, the automated assistant may provide one or more separate pieces of content obtained from the given source as input to a machine learning model trained to provide, as output, an embedding of the content in an embedding space. The distance between the embedding of the content from the given source and various other embeddings known to be associated/non-associated with that source type may then inform the automated assistant as to the degree of "matching" between the source type of the source parameter rule and the "type" of the given source. In some such implementations, the user may also be able to provide feedback in response to being presented with content from a given source with an indication of the "type" of the given source and/or of the association or non-association of the given source with the source type indicated by the rule. For example, the user can say "I don't think that news source is British" and the automated assistant can remove it from a collection of "British news sources" associated with the rule or can re-determine its embedding in embedding space based on different content from the source.

In some implementations, the degree of preference indicated by a source parameter rule may also be used in ranking search results and/or their corresponding sources. For example, if a user were to request creation of a source parameter rule by saying "I prefer to get my news from CG Weekly", then the corresponding source parameter rule may indicate a high, but not absolute, preference for the "CG Weekly" source for "news" requests. Thus, even though the content from "CG Weekly" might be determined to be lower quality content, for example, the search results from "CG Weekly" (and/or from other sources determined to be similar to or associated with "CG Weekly") may still be highly ranked. If however, for example, the user created the source parameter rule by saying "Only give me news from CG Weekly", then the corresponding source parameter rule may indicate a higher level of preference, or even an absolute preference, for the "CG Weekly" source for "news" requests. In this example, the automated assistant may only provide content associated with "CG Weekly", even if it is out-of-date or severely inaccurate, or may at least include an indication in the assistant response to the user that the source parameter rule was violated when content from any other source is included in the assistant response.

In some implementations, the degree of matching between the rule parameters and the sources associated with the content may not be used in the ranking, but may be used in the selecting. For example, the automated assistant 120 may obtain a plurality of search results and rank them based on responsiveness to the user request and general popularity of the content. Subsequently, the automated assistant 120 may evaluate the top X ranked search results to determine if one or more of these top X ranked search results satisfy the rule parameters for the source parameter rule(s) that correspond to the user request type. In such implementations, the automated assistant 120 may select one or more of the highest ranked search results that satisfy the rule parameters of the corresponding source parameter rule. If none of the top X ranked search results satisfy the rule parameters of the corresponding source parameter rule, then the automated assistant 120 may inform the user that no responsive content is available, may provide responsive content from another highest ranked search result, may evaluate the next top Y ranked search results for content that satisfies the rule parameters, and/or may determine that another source parameter rule should apply instead, as described herein.

Once source/result selection engine 128 selects one or more of the obtained results, the one or more selected results are provided to output engine 130 for presentation to the user in response to the user request. In implementations in which selecting one or more of the results for presentation to the user violates the source parameter rule, source/result selection engine 128 may also provide output engine 130 with an indication that the source parameter rule has been violated. Such an indication may include details as to how the selection of one or more of the results has violated the source parameter rule. In some implementations, source/result selection engine 128 may additionally or alternatively provide output engine 130 with an indication of the selection of one or more of the results that follows the source parameter rule. In some other implementations, one or more additional components of the automated assistant 120 will determine when the source parameter rule has been followed and/or violated, such as output engine 130 or rule engine 124.

Output engine 130 receives the one or more results selected by source/result selection engine 128 and uses them to generate an output response to be provided to the user in response to the user request. Output engine 130 also obtains the rule parameters of the corresponding source parameter rule, including the request type corresponding to the user request, from rule engine 124. In some implementations, output engine 130 also receives an indication of whether the corresponding source parameter rule has been violated from one or more other components of the automated assistant 120, such as source/result selection engine 128. In other implementations, output engine 130 uses the received rule parameters of the source parameter rule to make the determination as to whether the source parameter rule was followed in selecting the one or more results for presentation to the user. Output engine 130 will then generate a response to the user request, which may include one or more indications of whether the source parameter rule was followed and/or violated in selecting given content from a given source for inclusion in the response. Output engine 130 then causes one or more of the user interface output device(s) 104 to audibly or visually present the response to the user request, as described herein.

Figure 2A:
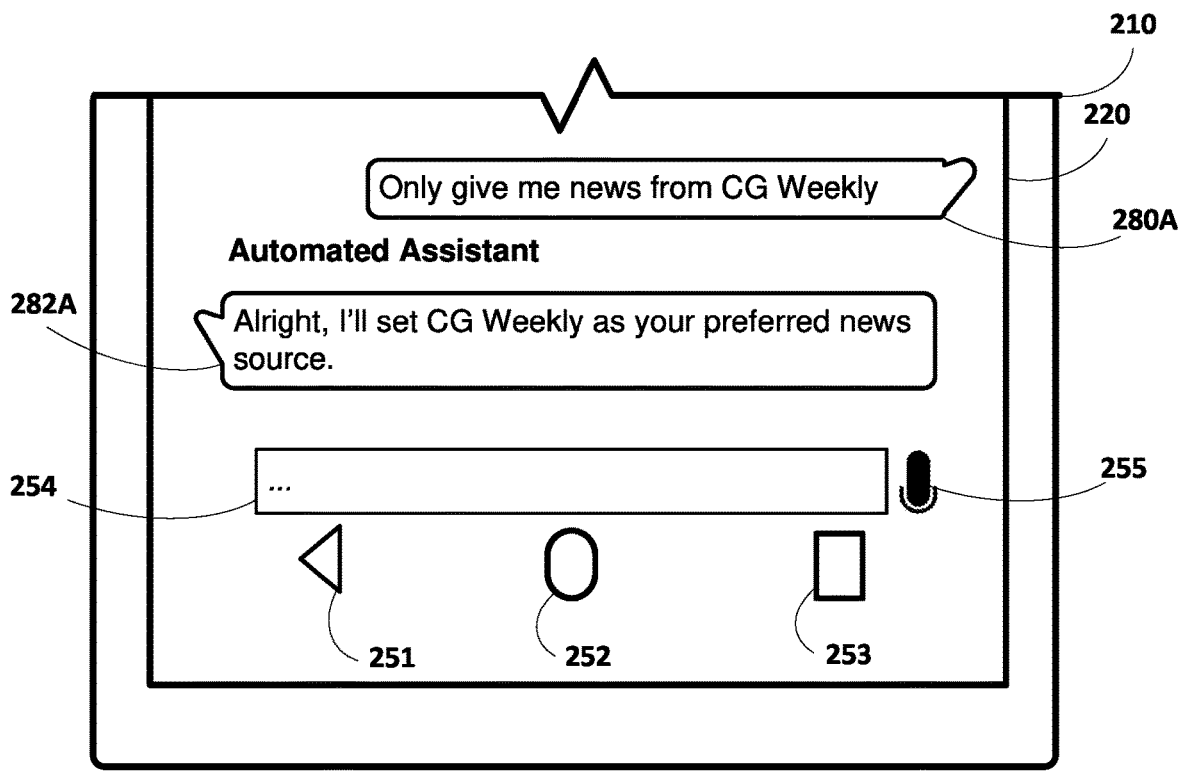
FIG. 2A and FIG. 2B illustrate an example client computing device with a display screen displaying an example of dialog that may occur between a user of the client computing device and an automated assistant according to implementations disclosed herein.
Figure 2B:
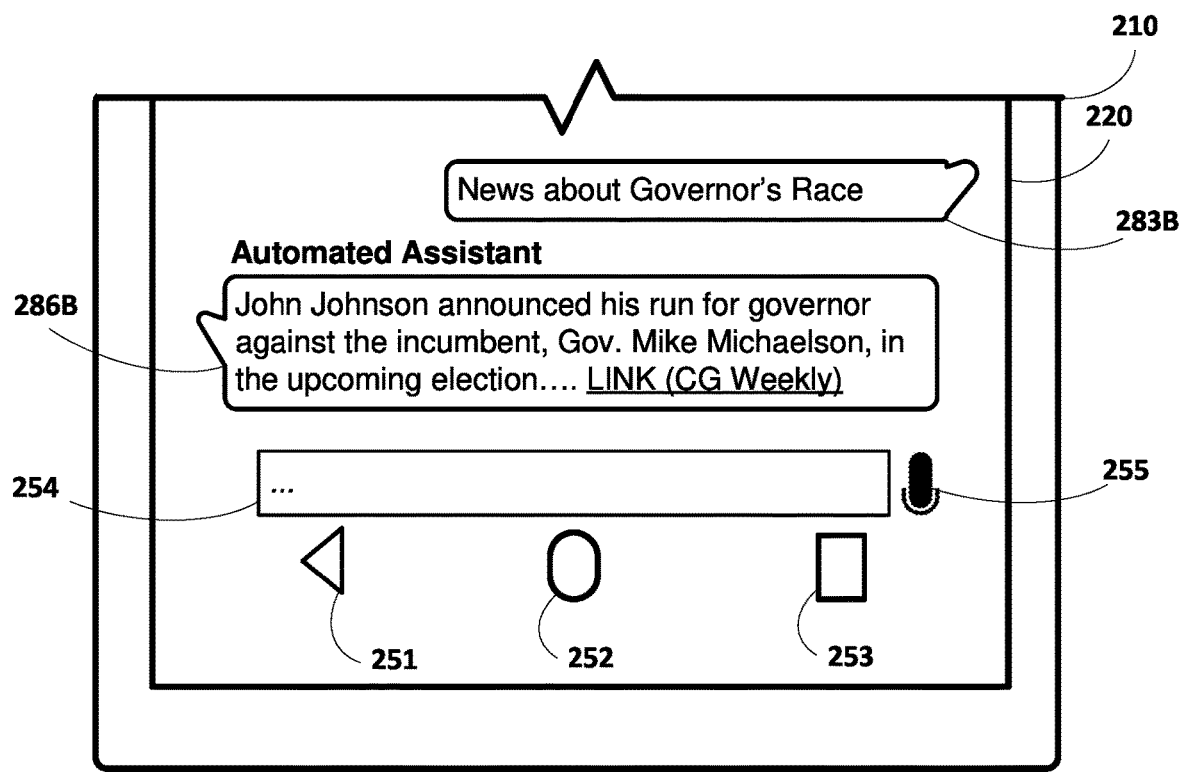

FIGS. 2A-2B illustrate a computing device 210 with a display screen 220 displaying examples of dialog that may occur between a user of the computing device 210 and the automated assistant 120 according to implementations disclosed herein. The computing device 210 of FIGS. 2A-2B includes one or more microphones and one or more speakers and the illustrated dialog includes examples of dialog that may occur, via the microphone(s) and speaker(s), between a user of the computing device 210 and the automated assistant 120 according to implementations described herein. One or more aspects of the automated assistant 120 may be implemented on the computing device 210 and/or on one or more computing devices that are in network communication with the computing device 210.

The display 220 of computing device 210 further includes a textual reply interface element 254 that the user may select to generate user interface input via a virtual keyboard and a voice reply interface element 255 that the user may select to generate user interface input via a microphone. In some implementations, the user may generate user interface input via the microphone without selection of the voice reply interface element 255. For example, during the dialog, active monitoring for audible user interface input via the microphone may obviate the need for the user to select the voice reply interface element 255. In some of those and/or in other implementations, the voice reply interface element 255 may be omitted. Moreover, in some implementations, the textual reply interface element 254 may additionally and/or alternatively be omitted (e.g., the user may only provide audible user interface input). The display screen 220 of FIGS. 2A-2B also includes system interface elements 251, 252, 253 that may be interacted with by the user to cause the computing device 210 to perform one or more actions.

In FIG. 2A, the user provides initial textual input 280A as part of a dialog between the user and the automated assistant 120. In the example of FIG. 2A, the initial textual input 280A comprises a request to "Only give me news from CG Weekly". In response to the textual input 280A, the automated assistant 120 determines that the user wants to create a source parameter rule indicating that "CG Weekly" is a preferred source for future "news" request types. The automated assistant 120 generates the source parameter rule and stores it in association with a user account profile of the user and/or a client device profile of the client device. The automated assistant 120 then provides the user with a response 282A indicating that the source parameter rule has been created, in this case that "CG Weekly" has been set as the user's preferred news source for "news" request types.

Turning now to FIG. 2B, the user provides subsequent textual input 283B during a subsequent dialog between the user and the automated assistant 120. The subsequent textual input 283B provided by the user in FIG. 2B is "News about Governor's Race". The automated assistant 120 determines that the subsequent textual input 283B "News about Governor's Race" corresponds to a "news" type of request, and that the previously generated source parameter rule of FIG. 2A indicates that "CG Weekly" is a preferred source for "news" request types. The automated assistant 120 determines other search parameters based on the subsequent textual input 283B and context signals associated with the user and accessible to the automated assistant 120. For example, the automated assistant 120 may determine that a search query of "Governor's Race" should be used in performing a search based on the subsequent textual input 283B. As another example, the automated assistant 120 may determine that "Colorado", the user's home state and/or current location, should be used as an additional search term or search filter.

After determining search parameters based on the subsequent textual input 283B, context signals associated with the user and accessible to the automated assistant 120, and the source parameter rule determined to be associated with the subsequent textual input 283B, the automated assistant 120 performs a search of the preferred source indicated by the source parameter rule, "CG Weekly". As depicted in FIG. 2B, the automated assistant 120 may then provide the user with a response 286B of "John Johnson announced his run for governor against the incumbent, Gov. Mike Michaelson, in the upcoming election . . . ". In implementations where the response from the automated assistant 120 is provided verbally, the automated assistant 120 may provide a snippet of the relevant content obtained from "CG Weekly" and then prompt the user "Would you like to hear more?". In implementations in which the response from the automated assistant 120 is provided in textual form, the automated assistant 120 may provide the snippet in textual form including a link to the full content for the user to select if they would like more information. In some implementations, the automated assistant may provide the entirety of the relevant news content obtained from "CG Weekly" about the "Governor's Race" in audible and/or textual form if rendering the audible response or the textual response would require less than a threshold amount of time or display screen space. For example, if the user asks a yes or no question, the automated assistant 120 may merely respond with yes or no, and may or may not include a link or prompt to follow for more information.

Figure 3A:
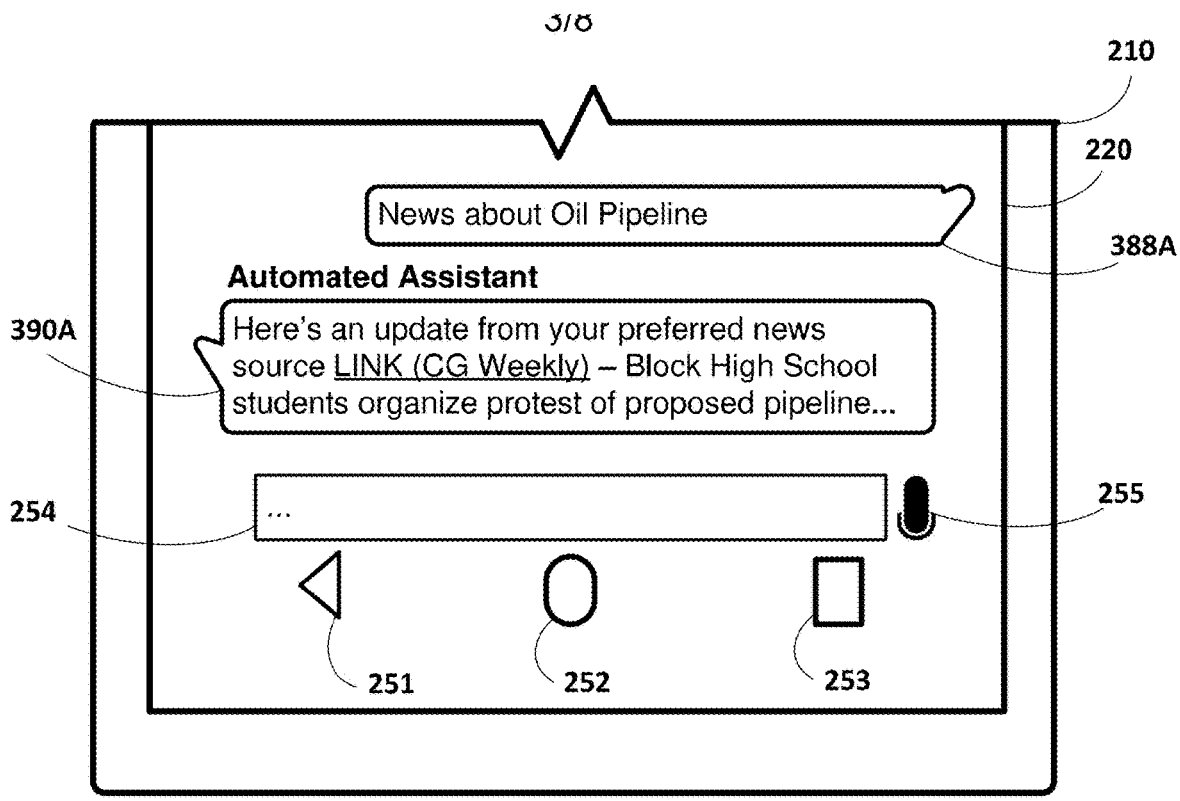
FIG. 3A, FIG. 3B, and FIG. 3C illustrate the example client computing device of FIGS. 2A and 2B, with part of a display screen displaying another example of dialog that may occur between a user of the client computing device and an automated assistant according to implementations disclosed herein.
Figure 3B:
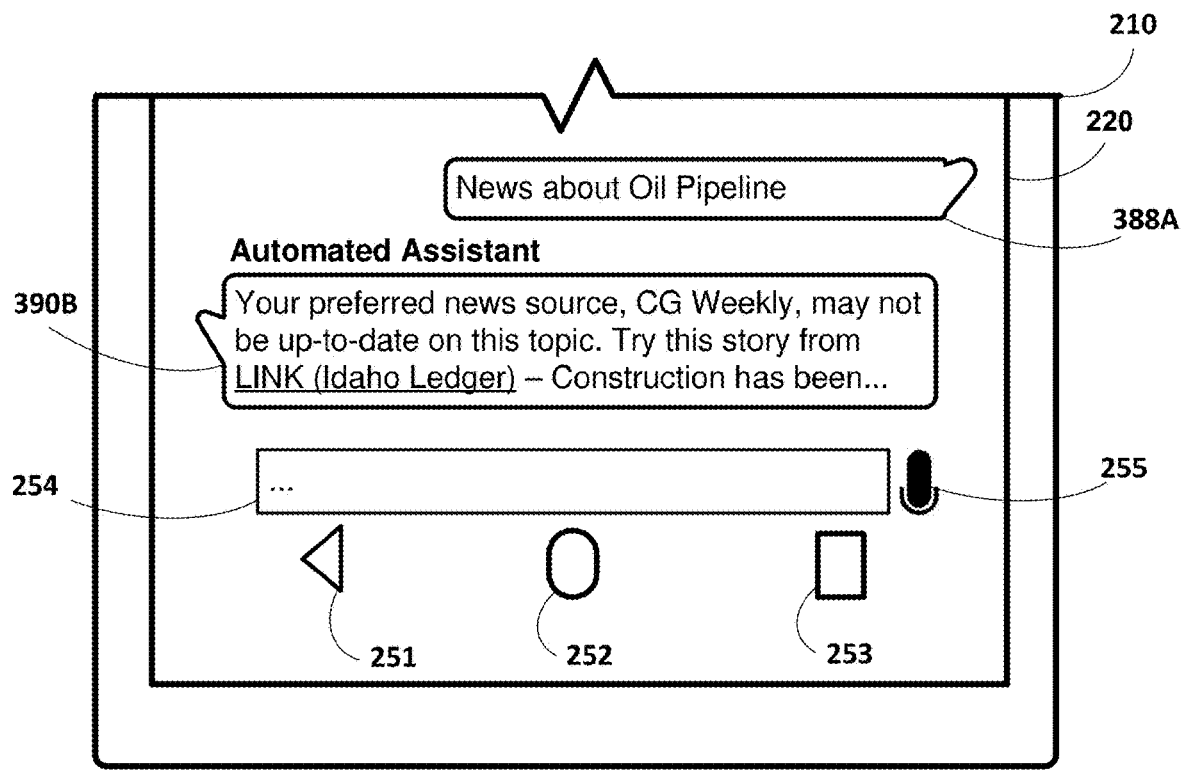
Figure 3C:
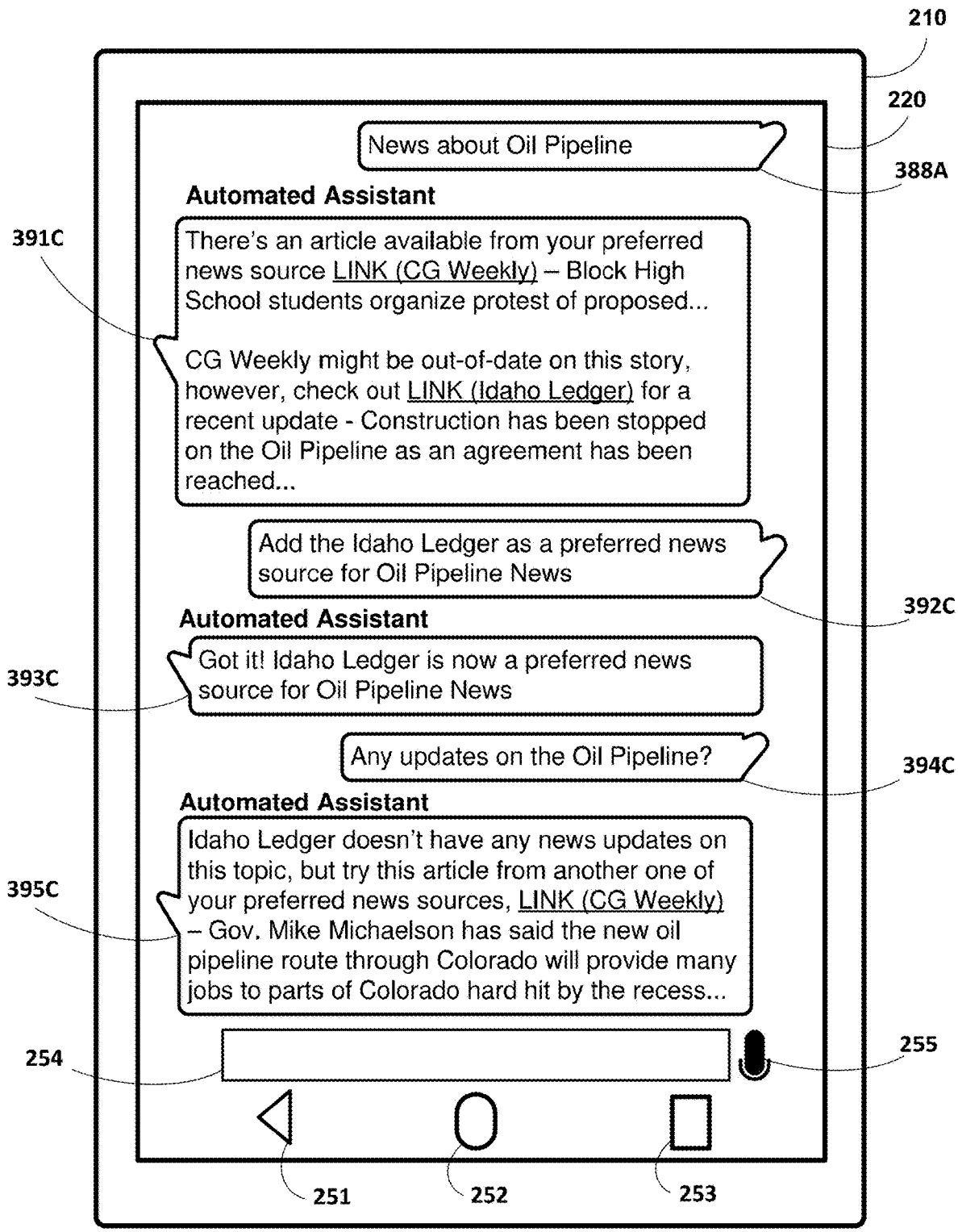

FIGS. 3A, 3B, and 3C illustrate the computing device 210 of FIGS. 2A-2B and illustrates examples of dialog that may occur, via the microphone(s) and speaker(s), between a user of the computing device 210 and the automated assistant 120 according to implementations described herein. The dialog between the user and the automated assistant 120 illustrated in FIGS. 3A, 3B, and 3C occurs after the dialog of FIG. 2A, wherein the user set up a source parameter rule for "news" type requests that specifies "CG Weekly News" as a preferred source.

In FIG. 3A, the user provides initial textual input 388A of "News about Oil Pipeline" as part of a dialog between the user and the automated assistant 120. In response to the textual input 388A, the automated assistant 120 determines that the textual input 388A corresponds to a "news" type request, for which there is an associated source parameter rule indicating "CG Weekly News" is a preferred source for "news" type requests for this particular user and/or client computing device 210. The automated assistant obtains responsive content from the user's preferred news source, "CG Weekly News", and provides a textual response 390A for presentation on the display screen as part of the dialog. In this example of FIG. 3A, the automated assistant 120 replies "Here's an update from your preferred news source LINK (CG Weekly)—Block High School students organize protest of proposed pipeline . . . ".

FIG. 3B shows an alternate response from the automated assistant to the initial textual input 388A of "News about Oil Pipeline" received from the user. In FIG. 3B, the automated assistant provides the response 390B "Your preferred news source, CG Weekly, may not be up-to-date on this topic. Try this story from LINK (Idaho Ledger)—Construction has been . . . ". In the example implementation of FIG. 3B, the automated assistant 120 performs a search based on the user request of both the preferred source indicated by corresponding source parameter rule, as well as of one or more additional sources not included in the preferred sources indicated by source parameter rule corresponding to the type of user request.

In some implementations, the automated assistant 120 may provide the response 390B based on determining that another source, "Idaho Ledger", is more up-to-date, authoritative, and/or relevant to the user request included in the textual input 388A. In some implementations, the automated assistant 120 may rank search results performed based on searches of both the preferred sources and the additional sources, rank preferred results obtained from preferred sources and additional results obtained from additional sources, and compare the ranks of the content corresponding to one or more of the preferred sources and to one or more of the additional sources in order to select the content to include in the response 390B to the textual input 388A.

In some implementations, the search of and/or selection of the content associated with the "Idaho Ledger" may be performed based on one or more answer parameters associated with the source parameter rule. Answer parameters may comprise various forms of data or metadata stored in one or more local or remote databases linking, pointing to, or otherwise relating two or more source parameter rules. One or more answer parameters may be associated with a given source parameter rule based on explicit user input and/or based on the automated assistant 120 determining that two or more source parameter rules are associated with one another (e.g., based on new or existing source parameter rules, other new or existing answer parameters, historical user interaction data, a knowledge graph of predetermined topics or entities, etc.).

For example, a user may provide the explicit request "use the 'Colorado Star' if 'CG Weekly' isn't available". The automated assistant 120 may then generate a child source parameter rule of the parent source parameter rule (or otherwise associate a new source parameter rule with the existing source parameter rule) that specifies "CG Weekly News" as a preferred source for "news" type requests. The child source parameter rule can identify next-most-preferred sources that should be searched and/or have their content selected for presentation to the user based on the preferred source of the parent source parameter rule failing to include content that is sufficiently relevant, authoritative, up-to-date, output-friendly, etc.

In some implementations, the automated assistant 120 can generate one or more new source parameter rules and/or new answer parameters associating two or more source parameter rules based on the current user request, the various context signals described herein, existing source parameter rules, and/or existing answer parameters associating two or more source parameter rules. For example, a given user may be associated with "Source Parameter Rule A" indicating that "Idaho Ledger" is a preferred source for "Oil Pipeline News" type user requests and that "Source Parameter Rule B", which indicates that "CG Weekly News" is a preferred source for "news" type user requests, should be searched for "Oil Pipeline News" type requests if no relevant content is available from "Idaho Ledger", or if the relevant content available from "Idaho Ledger" is determined to be non-authoritative, not up-to-date, etc. The automated assistant 120 may determine, based on the frequency with which user requests corresponding to the "Oil Pipeline News" request type are responded to with content from "CG Weekly News", that "CG Weekly News" should be added as a preferred source for "Oil Pipeline News". The automated assistant 120 then generates a new source parameter rule and/or one or more new answer parameter rules associating "Source Parameter Rule A" and "Source Parameter Rule B" indicating such. The automated assistant 120 can also prune source parameter rules and/or answer parameters determined to be old, defunct, infrequently used in responses to user requests of that type, in conflict with more recently created rules or parameters, etc.

FIG. 3C shows an alternative response from the automated assistant 120 to the initial textual input 388A, and follow up dialog between the user and the automated assistant 120 with respect to establishing and following additional source parameter rules. In FIG. 3C, the user provides the initial textual input 388A of "News about Oil Pipeline". The automated assistant 120 determines this corresponds to a "news" type request, for which there is an associated parameter rule indicating that "CG Weekly" is a preferred news source. The automated assistant performs one or more searches of the preferred news source indicated by the corresponding source parameter rule, "CG Weekly", as well as of one or more additional sources not indicated as preferred sources for "news" type requests by the parameter rule. In the example of FIG. 3C, the additional sources include at least one additional source, "Idaho Ledger". The automated assistant 120 identifies one or more preferred results obtained based on the search of the preferred source, "CG Weekly", as well as one or more additional results obtained based on the search of the one or more additional sources. The automated assistant 120 compares the content obtained from the preferred source to the content obtained from the one or more additional sources.

In the example of FIG. 3C, the automated assistant 120 determines that the content from the user's preferred "news" source, "CG Weekly", is out-of-date and that the content from an additional "news" source, "Idaho Ledger", is more up-to-date. Based on these determinations, and based on the source parameter rule for "news" type requests indicating "CG Weekly" as the preferred "news" source, the automated assistant 120 responds to the textual input 388A with a response 391C including "There's an article available from your preferred news source LINK (CG Weekly)—Block High School students organize protest of proposed . . . " and "CG Weekly might be out-of-date on this story, however, check out LINK (Idaho Ledger) for a recent update—Construction has been stopped on the Oil Pipeline as an agreement has been reached . . . ".

The response 391C from the automated assistant 120 includes from the preferred source, "CG Weekly", as well as more recent content relevant to the user request and obtained from an additional source, "Idaho Ledger", not indicated by the source parameter rule for "news" type requests. The response 391C also indicates that at least some of the content included in the response 391C is from a source other than the source(s) indicated by the source parameter rule for the type of request corresponding to the user textual input 388A. Thus, the user can review the provided response 391C and determine that "Idaho Ledger" is a good and/or better source for "news" information on the "Oil Pipeline" topic.

The user then provides subsequent textual input 392C of "Add the Idaho Ledger as a preferred news source for Oil Pipeline News". The automated assistant 120 determines that the user is requesting the creation of a new source parameter rule, and creates a new source parameter rule for "Oil Pipeline News" type requests that indicates "Idaho Ledger" as a preferred source. The automated assistant then provides the response 393C, "Got it! Idaho Ledger is now a preferred news source for Oil Pipeline News.

Later (e.g., hours, days, or weeks after the textual input 392C), the user provides another request textual input 394C of "Any updates on the Oil Pipeline?". The automated assistant 120 determines that this is a user request corresponding to the "Oil Pipeline News" request type, for which there is an associated parameter rule indicating that "Idaho Ledger" is a preferred source for "Oil Pipeline News" information. In response to this determination, the automated assistant 120 performs one or more searches of the preferred news source indicated by the source parameter rule, "CG Weekly", and of one or more additional sources. The automated assistant 120 then compares the content obtained from the preferred source, "Idaho ledger", to the content obtained from the one or more additional sources in order to select which content to present and/or how to present each type of content to the user.

In one example implementation of FIG. 3C, the one or more additional sources searched by the automated assistant 120, which are not indicated as preferred sources by a source parameter rule for "Oil Pipeline News", may not include the "CG Weekly" source associated with a different source parameter rule corresponding to "news" request types. In such an implementation, the automated assistant 120 may determine, based on comparing the content obtained from "Idaho Ledger" to the content obtained from the one or more additional sources, that the content obtained from the "Idaho Ledger" is out-of-date, non-authoritative, or is otherwise predicted to have a low level of relevance to the user request. Based on this determination, the automated assistant 120 determines if there are other source parameter rules that may indicate sources preferred by the user for similar requests (e.g., based on a knowledge graphs of request types and/or request topics). Thus, in the example of FIG. 3C, the automated assistant 120 identifies the other source parameter rule associated with "news" requests that indicates that "CG Weekly" is a preferred source. In response to this determination, and based on determining that the content obtained from "Idaho Ledger" was out-of-date, non-authoritative, or not very relevant to the user request, the automated assistant 120 will perform a search of "CG Weekly" (i.e., a search of one or more of the sources indicated as preferred by source parameter rule(s) associated with similar user request types).

The automated assistant 120 then compares the content obtained from "CG Weekly" to the content obtained from "Idaho Ledger" and/or the content obtained from the search of the one or more additional searches. In some implementations, the automated assistant 120 may also search one or more different additional sources (e.g., associated with less similar request types or non-associated with any request type) or re-search the one or more additional sources using different key words or filters (e.g., including a date filter after an "Idaho Ledger" article from Feb. 1, 2020 is determined to be out-of-date). In such implementations, the content from these additional searches will also be compared to the content obtained from "CG Weekly". The automated assistant 120 will then select which content to present and how based on the comparisons and present the requested information in a response to the user.

In an alternative example implementation of FIG. 3C, the automated assistant 120 can perform the initial one or more searches of the preferred source, "Idaho Ledger", and the one or more additional sources, and the one or more additional sources do include the user's preferred source for "news" requests, "CG Weekly". In such an implementation, "CG Weekly" may be searched based on being associated with a source parameter rule for a similar type of request, or may be selected for searching based on one or more other factors (e.g., historical user interaction data showing an association with the topic or a frequency of use, default search parameters, etc.). The automated assistant 120 then compares the content obtained from the preferred source, "Idaho Ledger", to the content obtained from the one or more additional sources, including the content obtained from "CG Weekly". The automated assistant 120 will then select which content to present and how based on the comparisons and present the requested information in a response to the user. In some implementations, the automated assistant 120 may favor selection of the "CG Weekly" content over the content of the other one or more additional sources not associated with the most relevant source parameter rule based on "CG Weekly" being indicated as a preferred source associated with the user or client device, and/or based on "CG Weekly" being a preferred source for similar types of user requests for the user or client device.

In yet another example implementation of FIG. 3C, the automated assistant 120 first performs a search of only the preferred source(s) indicated by the source parameter rule determined to be most relevant to a user request. Thus, the automated assistant 120 would only search "Idaho Ledger" for content related to the user request. In this example, the automated assistant 120 determines that there is no relevant content available to present to the user. For example, the automated assistant 120 may determine that no new updates have been posted on the "Oil Pipeline News" topic by "Idaho Ledger" since the last time the user accessed and/or was presented with "Oil Pipeline News" content from "Idaho Ledger". Once the automated assistant 120 determines that no relevant content is available from the preferred source(s) indicated by the source parameter rule determined to be most relevant to the user request, the automated assistant 120 identifies another source parameter rule associated with similar types of user requests (e.g., "news" requests) that indicates "CG Weekly" as a preferred "news" source. The automated assistant 120 then performs a search of one or more of the sources indicated as preferred by the next most relevant source parameter rule(s). In some implementations, this second iteration of searches will also include searching one or more additional sources not indicated by any source parameter rules determined to be relevant or next most relevant to the user request. In other implementations, the automated assistant 120 may not search one or more additional sources if relevant content is obtained from a search of the next most relevant source(s). The automated assistant 120 will then select which content to provide based on relevance to the user request. In some implementations, the automated assistant 120 will favor content obtained from the next most relevant source to the user request, "CG Weekly", over content retrieved from additional sources not associated with any source parameter rule determined to be relevant to the user request.

In FIG. 3C, the automated assistant has determined that no content, or at least no content relevant to the user request, is available from the preferred source for "Oil Pipeline News", the "Idaho Ledger", but relevant content is available from a source preferred by the user for "news" requests, "CG Weekly". The automated assistant then provides the response 395C, "Idaho Ledger doesn't have any news updates on this topic, but try this article from another one of your preferred news sources, LINK (CG Weekly)—Gov. Mike Michaelson has said the new oil pipeline route going through Colorado will provide many jobs to parts of Colorado hit by the recess . . . ". Thus, the user is informed that their source parameter rule for "Oil Pipeline News" has been violated, but that a source parameter rule for "news" type requests has been followed.

Figure 4:
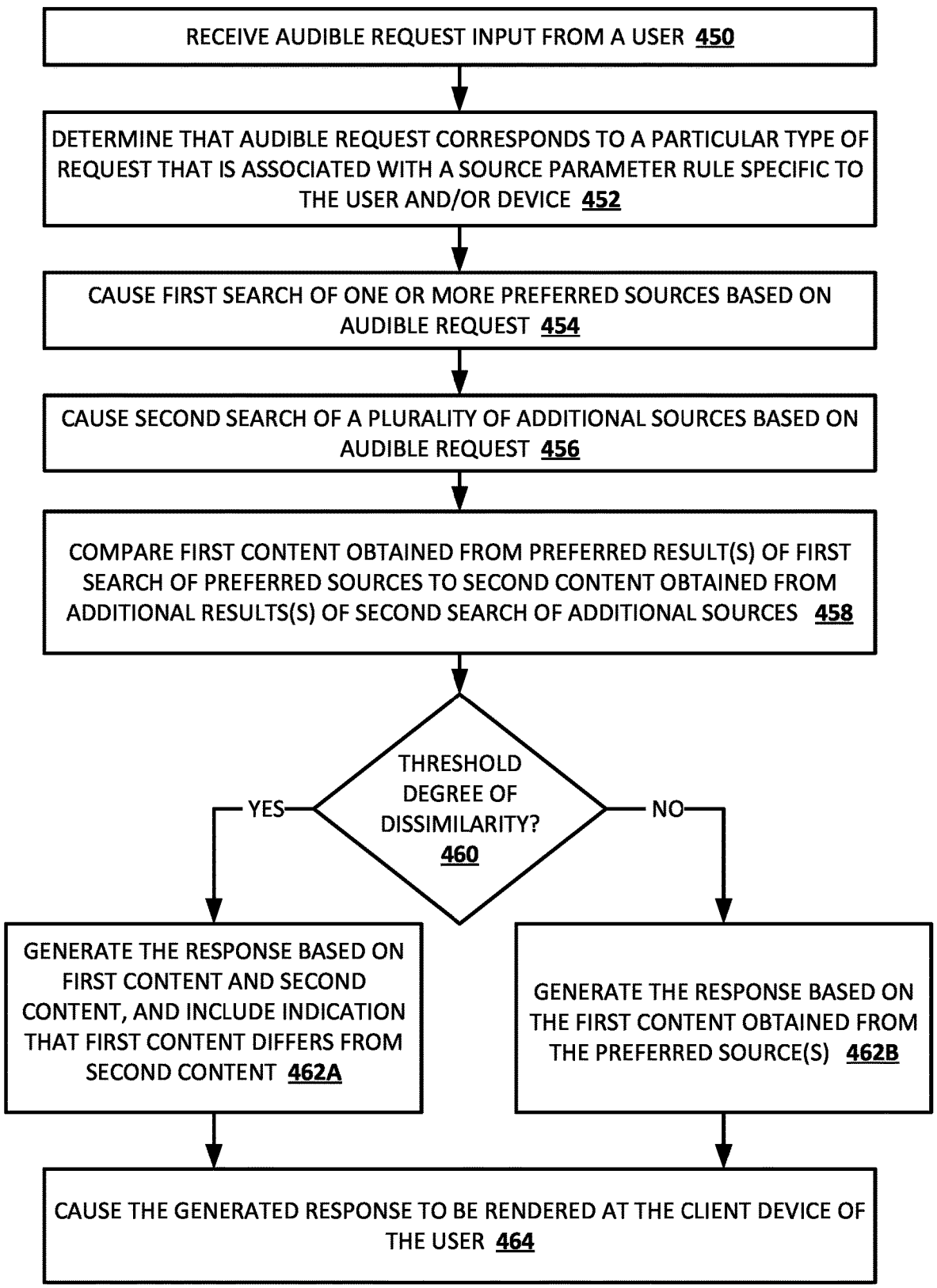
FIG. 4 is a flowchart illustrating an example method according to implementations disclosed herein.

FIG. 4 depicts a flowchart illustrating an example method 400 of using a source parameter rule to respond to a user request according to implementations disclosed herein. For convenience, the operations of the method 400 are described with reference to a system that performs the operations. This system may include various components of various computer systems, such as one or more components of the automated assistant 120 of FIG. 1 and/or of a client device. Moreover, while operations of the method 400 are shown in a particular order, this is not meant to be limiting. One or more operations may be reordered, omitted or added.

At block 450, the system receives audible request input provided by a user and captured by one or more microphones of a client device.

At block 452, the system processes the audible request input and determines, based on processing the audible request input and/or based on processing a transcription generated based on processing the audible request input, that the audible request corresponds to a particular type of request that is associated with a source parameter rule that is specific to the particular user who provided the audible request and/or is specific to the particular client device that received the audible request. The source parameter rule that it is determined is associated with the particular type of request defines one or more preferred sources to be used in responding to that particular type of request.

In some implementations, processing the audible request input may further include voice recognition, e.g., matching a voice detected in the audio data to one or more voice recognition profiles of a user account associated with the user. In such implementations, the audible request input may be classified as being spoken by a particular user associated with the particular user account including the matching voice recognition profile(s). In some implementations, the system can attribute the spoken utterance to the particular user or user account based on historical automated assistant interaction data that indicates receipt of the audible request input is likely associated with that user and/or account. For example, the historical automated assistant interaction data may indicate that the assistant device that received the audible request input has historically been mainly, only, or most recently used by a particular user or account.

At block 454, the system causes a first search of the one or more preferred sources indicated by the corresponding source parameter rule to be performed. This first search is performed based on the user request (e.g., based on search parameters determined based on the user request, as described herein). The system may utilize various techniques in searching one or more local or remote databases based on the annotations and textual input included in the transcription of the audible request, such as conventional and/or other information retrieval techniques. The system obtains one or more preferred results based on the search of the one or more preferred sources.

At block 456, the system causes a second search of one or more additional sources not indicated as preferred sources by the corresponding source parameter rule to be performed. This second search is performed based on the user request (e.g., based on search parameters determined based on the user request, as described herein). The system obtains one or more additional results based on the search of the one or more additional sources. In some implementations, block 456 can be performed only in response to first determining that preferred result(s), obtained at block 454, fail to satisfy one or more criteria, such as quality criteria. In those implementations, if it is determined that the preferred result(s), obtained at block 454, satisfy the one or more criteria, the system can instead proceed directly to block 462B.

At block 458, the system compares first content obtained from the one or more preferred results of the first search to second content obtained from the one or more additional results of the second search. For example, the system may embed each of the first content and the second content in a vector space (e.g., using "word2vec", "BERT", or other techniques) based on processing the information that is included in the content, using one or more embedding machine learning models (e.g., a trained encoder neural network). Once the first content and the second content are represented as vectors, the system can identify similarities and differences between content of preferred results and additional results based on the similarity/dissimilarity of the vectors in the vector space.

At block 460, the system determines, based on the comparison, if there is at least a threshold degree of dissimilarity between the first content and the second content. The comparison may reveal, for example, that the first content is considerably older than the second content, the second content is considered more authoritative than the first content, the first content and the second content contain conflicting details (e.g., dates, names, events, etc.), the second content is more detailed than the first content, and so on. If the system determines that there is at least a threshold degree of dissimilarity between the first content of the one or more preferred results and the second content of the one or more additional results, the system proceeds to block 462A. If the system determines that there is not at least a threshold degree of dissimilarity between the first content associated with one or more of the preferred sources and the second content associated with one or more of the additional sources, then the system proceeds to block 462B.

At block 462A, the system generates the response to the audible user request including at least some of the first content associated with one or more of the preferred sources and also including at least some of the second content associated with one or more of the additional sources. The response is also generated by the system to include an indication that the first content obtained from one or more of the preferred sources indicated by the source parameter rule differs from the second content corresponding to one or more of the additional sources not indicated by the source parameter rule. Thus, if there is a sufficient degree of dissimilarity between the information obtained from the preferred sources and from the additional sources, then the user's request to preference the one or more preferred sources when generating responses to audible user requests may not be followed and/or may only be followed to a partial degree (e.g., including other sources when the source parameter rule indicates that only the preferred sources are to be used).

At block 462B, the system generates the response to the audible user request based on the first content obtained from the one or more preferred results of the first search of the one or more preferred sources. At block 462B, the system can generate the response based only on the first content and/or independent of any of the additional search result(s). Thus, if there is not a sufficient degree of dissimilarity between the information obtained from the preferred sources and from the additional sources, then the user's request to prefer the one or more preferred sources when generating responses to audible user requests is respected.

At block 464, the system causes the generated response to be rendered at the client device of the user, as described herein.

As one non-limiting example, a user and/or his client device may have a source parameter rule created based on user input requesting "Please send me sports scores from KYZ Local News", where KYZ Local News is a news organization located in Colorado. Later, during a sports game played by the fictional "Orangesicles" of New York, the user may provide the audible request "What's the Orangesicles score?". The automated assistant 120 may process the audible user request using one or more natural language processing techniques described herein to generate a transcript, which may be an annotated transcript of the audible user input (e.g., annotated based on NLU processing and various available context signals).

The automated assistant 120 then determines, based on the transcript, that this audible request corresponds to a "sports score" request for which there is an associated source parameter rule. The automated assistant 120 searches KYZ Local News databases, websites, app-based video channels, etc. based on the audible request for "Orangesicles score". The automated assistant 120 may also search one or more additional sources, such as by performing a general web search based on the search query "Orangesicles score".

Next, the automated assistant 120 compares the content obtained from KYZ Local News based on "Orangesicles score" and the content obtained from the general web search based on the same. In this example, the search of KYZ Local News results in the automated assistant 120 obtaining a final score from last week's Orangesicles away-game played locally to the user in Colorado. In this example, the general web search results in the automated assistant 120 obtaining a current score of an ongoing Orangesicles home-game being played in New York. The automated assistant 120 will compare the preferred source content to the additional source content and determine that there is at least a threshold degree of dissimilarity such that the automated assistant 120 should also provide the user of the content obtained from the additional source not indicated by the source parameter rule.

The automated assistant 120 may cause the client device of the user to render the following response, "According to your preferred 'sports scores' source, KYZ Local News, the Orangesicles won an away game in Longbottom, Colorado on November 10$^{th}$ with a final score of 26-17. However, it looks like KYZ Local News does not have the scores for today's game. SPNE Sports Network says the Orangesicles are playing a home game in New York right now. The score is 12-24."

In some implementations, the system may additionally provide a prompt to the user to add the one or more additional sources to the existing source parameter rule for "sports scores", or to create an additional source parameter rule for "sports scores", or specific to "the Orangesicles". For instance, the automated assistant 120 may prompt the user "Do you want me to add SPNE Sports Network to your list of preferred sources for 'sports scores'?" or "Do you want me to search SPNE Sports Network for 'Orangesicles sports scores'?".

Figure 5:
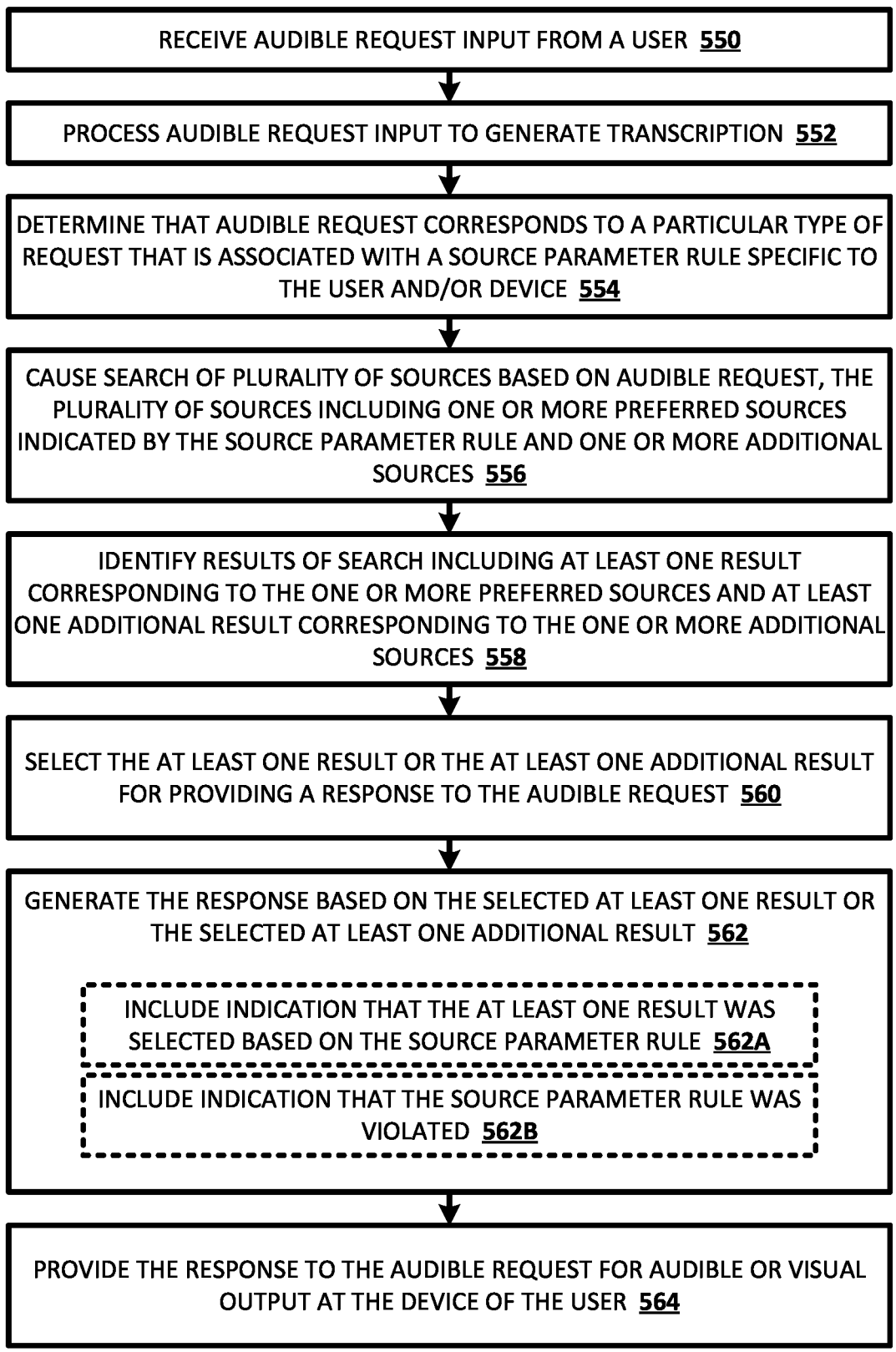
FIG. 5 is a flowchart illustrating an example method according to implementations disclosed herein.

FIG. 5 depicts a flowchart illustrating an example method 500 of using a source parameter rule to respond to a user request according to implementations disclosed herein. For convenience, the operations of the method 500 are described with reference to a system that performs the operations. This system may include various components of various computer systems, such as one or more components of the automated assistant 120 of FIG. 1 and/or of a client device. Moreover, while operations of the method 500 are shown in a particular order, this is not meant to be limiting. One or more operations may be reordered, omitted or added.

At block 550, the system receives audible request input provided by a user and captured by one or more microphones of a client device.

At block 552, the system processes the audible request input to generate a transcription of the audible request input. The processing may include generating a transcription of the spoken utterance and performing various natural language processing functions, such as generating annotations of the transcription, as described herein.

In some implementations, processing the audible request input may further include voice recognition, e.g., matching a voice detected in the audio data to one or more voice recognition profiles of a user account associated with the user. In such implementations, the audible request input may be classified as being spoken by a particular user associated with the particular user account including the matching voice recognition profile(s). In some implementations, the system can attribute the spoken utterance to the particular user or user account based on historical automated assistant interaction data that indicates receipt of the audible request input is likely associated with that user and/or account. For example, the historical automated assistant interaction data may indicate that the assistant device that received the audible request input has historically been mainly, only, or most recently used by a particular user or account.

At block 554, the system determines, based on the transcription, that the audible request corresponds to a particular type of request that is associated with a source parameter rule that is specific to the particular user who provided the audible request and/or is specific to the particular client device that received the audible request. The source parameter rule that it is determined is associated with the particular type of request defines one or more preferred sources to be used in responding to that particular type of request.

At block 556, the system causes a search of a plurality of sources to be performed based on the audible request. The plurality of sources searched includes the one or more preferred sources indicated by the source parameter rule and one or more additional sources, where the one or more additional sources are different from the one or more preferred sources indicated by the source parameter rule.

At block 558, the system identifies results based on the search of the plurality of sources. The identified results include at least one result corresponding to one or more of the preferred sources and at least one additional result corresponding to one or more of the additional sources.

At block 560, the system selects the at least one result or the at least one additional result for use in generating a response to the audible request. In some implementations, the system selects the at least one result or the at least one additional result for use in generating a response to the audible request based on a rank of each respective result. For example, the system may rank the results based on the various rule parameters of the source parameter rule, the content of the audible request and/or of the annotated transcription of the audible request, and based on various other context signals available to the system (e.g., date/time, location history, search logs, user interaction history, etc.). The system then compares a first rank of the at least one additional result corresponding to one or more of the additional sources to a second rank of the at least one result corresponding to one or more of the preferred sources, and selects either the at least one result or the at least one additional result based at least in part on the comparison of the rankings.

At block 562, the system generates the response to the audible request based on the selected at least one result or the selected at least one additional result. In some implementations, block 562 may additionally include one of blocks 562A or 562B. At block 562A, the system includes, in the generated response, an indication that the at least one result was selected for providing the response to the audible request based on the source parameter rule. At block 562B, the system includes, in the generated response, an indication that the source parameter rule was violated.

At block 564, the system causes the generated response to be rendered at the client device of the user, as described herein.

Figure 6:
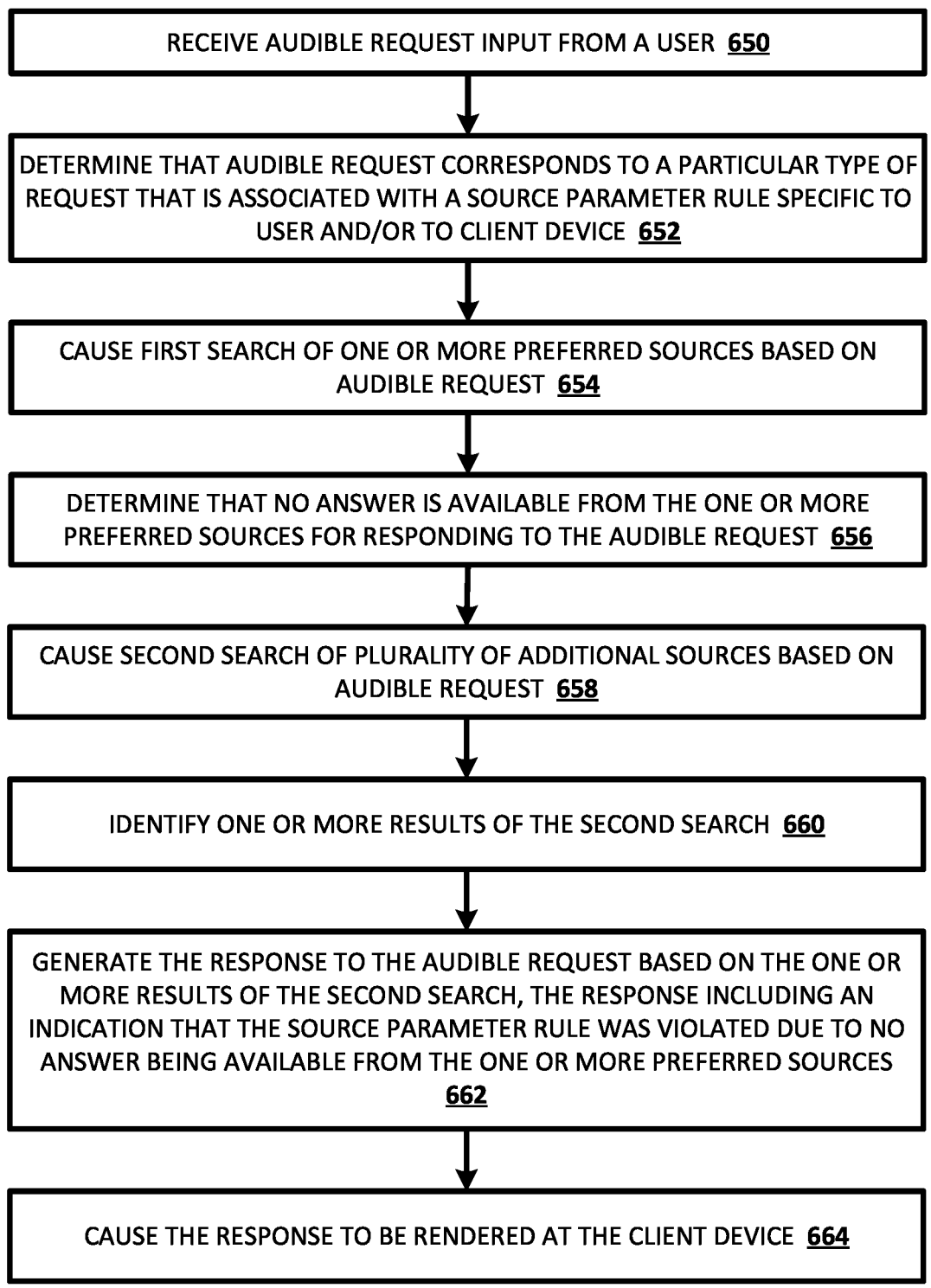
FIG. 6 is a flowchart illustrating an example method according to implementations disclosed herein.

FIG. 6 depicts a flowchart illustrating an example method 600 of using a source parameter rule to respond to a user request according to implementations disclosed herein. For convenience, the operations of the method 600 are described with reference to a system that performs the operations. This system may include various components of various computer systems, such as one or more components of the automated assistant 120 of FIG. 1 and/or of a client device. Moreover, while operations of the method 600 are shown in a particular order, this is not meant to be limiting. One or more operations may be reordered, omitted or added.

At block 650, the system receives audible request input provided by a user and captured by one or more microphones of a client device.

At block 652, the system processes the audible request input and determines, based on processing the audible request input and/or based on processing a transcription generated based on processing the audible request input, that the audible request corresponds to a particular type of request that is associated with a source parameter rule that is specific to the particular user who provided the audible request and/or is specific to the particular client device that received the audible request. The source parameter rule that it is determined is associated with the particular type of request defines one or more preferred sources to be used in responding to that particular type of request.

In some implementations, processing the audible request input may further include voice recognition, e.g., matching a voice detected in the audio data to one or more voice recognition profiles of a user account associated with the user. In such implementations, the audible request input may be classified as being spoken by a particular user associated with the particular user account including the matching voice recognition profile(s). In some implementations, the system can attribute the spoken utterance to the particular user or user account based on historical automated assistant interaction data that indicates receipt of the audible request input is likely associated with that user and/or account. For example, the historical automated assistant interaction data may indicate that the assistant device that received the audible request input has historically been mainly, only, or most recently used by a particular user or account.

At block 654, the system causes a first search of the one or more preferred sources indicated by the corresponding source parameter rule to be performed.

At block 656, based on the results of the first search, the system determines that no answer is available from the one or more preferred sources for responding to the audible request. For example, the system may determine that no content available from the one or more preferred sources is relevant to the audible user request. As another example, the system may determine that any content relevant to the topic of the audible user request available from the one or more preferred sources is out-of-date, non-authoritative, or not available in a context-friendly output format (e.g., only audio is available and the system determines the client device lacks a speaker or is currently located in a noisy environment, only video is available and the client device lacks a reliable network connection, etc.).

At block 658, the system causes a second search of a plurality of additional sources not indicated as preferred sources by the corresponding source parameter rule to be performed. In some implementations, for example, this may include performing a general web search or local-memory search based on one or more search parameters determined based on the audible user request. In some implementations, as another example, this may include performing searches of sources that are not indicated as preferred sources for the corresponding source parameter rule, but that are indicated as preferred sources for one or more additional source parameter rules determined to be related to the audible user request and/or to the source parameter rule that was determined to correspond to the determined type of the audible user request. In some implementations, block 658 can be performed only in response to first determining, at block 656, that no answer is available from the preferred source(s). In those implementations, if at block 656 it is determined an answer is available from the preferred source(s), the system can instead generate the response based on only the answer from the preferred source(s).

At block 660, the system identifies one or more results obtained from the second search of the plurality of additional sources.

At block 662, the system generates the response to the audible request based on the one or more results obtained from the second search of the plurality of additional sources. The system generates the response to further include an indication that the corresponding source parameter rule was violated for the response to the audible user request due to no answer being available from the one or more preferred sources indicated by the corresponding source parameter rule.

At block 664, the system causes the generated response to be rendered at the client device of the user, as described herein.

Figure 7:
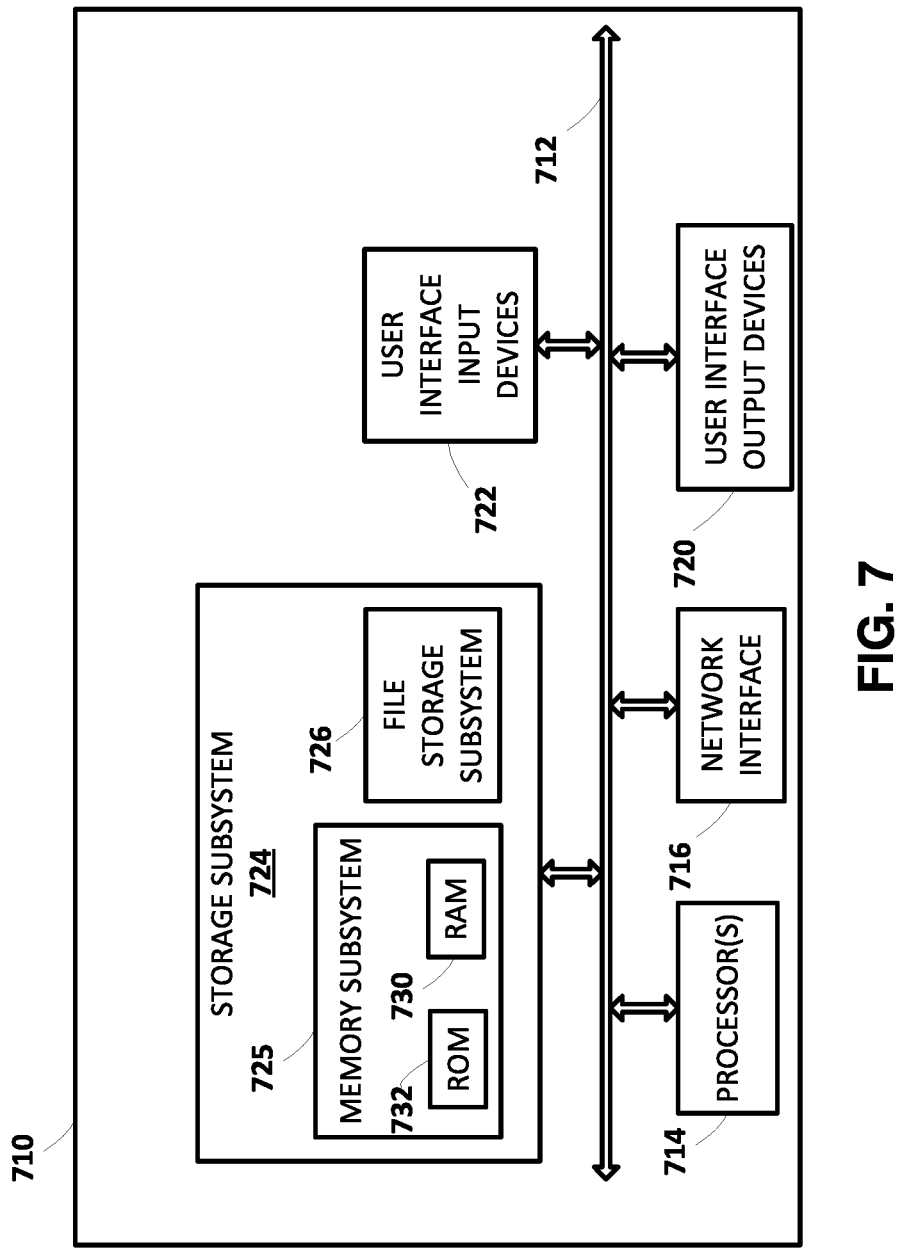
FIG. 7 illustrates an example architecture of a computing device.

FIG. 7 is a block diagram of an example computing device 710 that may optionally be utilized to perform one or more aspects of techniques described herein. In some implementations, one or more of a client computing device, automated assistant 120, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of methods described herein, such as the methods of FIGS. 4, 5, and/or 6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

What is claimed is:

1. A method implemented by one or more processors, the method comprising:
    training a machine learning model based on training examples generated based on a source parameter rule;
    receiving an audible request, of a user, that is captured via one or more microphones of a client device;
    processing one or more features of the audible request using the machine learning model to generate output that includes a transcription of the audible request;
    determining, based on the output, that the audible request corresponds to a particular type of request that is associated with the source parameter rule that is specific to the user and/or to the client device,
        wherein the source parameter rule defines one or more preferred sources to be used in responding to the particular type of request, and
        wherein determining the audible request corresponds to the particular type of request that is associated with the source parameter rule comprises:
            identifying a primary source parameter rule from a plurality of candidate parameter rules associated with the user,
            determining that content associated with a primary source of the primary source parameter rule fails to satisfy information requirements of the user request, and
            selecting the source parameter rule from the plurality of candidate source parameter rules based on one or more answer parameters,
            wherein the one or more answer parameters are customized by the user and define which of the plurality of source parameter rules to utilize for responding to the audible request based on the content of the primary source associated with the primary source parameter rule failing to satisfy information requirements of the user request;
    causing a first search of the one or more preferred sources to be performed based on the audible request and the source parameter rule;
    causing a second search of a plurality of additional sources to be performed based on the audible request and the source parameter rule, the plurality of additional sources not being included in the one or more preferred sources;
    comparing first content of one or more preferred results obtained based on the first search of the one or more preferred sources to second content of one or more additional results obtained based on the second search of the plurality of additional sources; and
    based on the comparison indicating at least a threshold degree of dissimilarity between the first content of the one or more preferred results and the second content of the one or more additional results:
    generating a response to the audible request, the response including:
        at least some of the first content,
        at least some of the second content, and
        an indication that the first content obtained from one or more of the preferred sources indicated by the source parameter rule differs from the second content corresponding to one or more of the plurality of the additional sources not indicated by the source parameter rule; and
    causing the response to the audible request to be rendered at the client device.

2. The method of claim 1, wherein the source parameter rule is generated based on a previous audible request indicating the particular type of request and the one or more preferred sources to be used in responding to the particular type of request.

3. The method of claim 1, wherein determining, based at least in part on the transcription, that the audible request corresponds to the particular type of request that is associated with the source parameter rule that is specific to the user and/or to the client device comprises:
    performing natural language processing on the transcription to determine an intent of the audible request; and
    determining, based on the intent of the audible request being stored in association with the particular type of request, that the audible request corresponds to the particular type of request that is associated with the source parameter rule that is specific to the user and/or the client device.

4. The method of claim 3, wherein determining, based on the intent of the audible request, that the audible request corresponds to the particular type of request that is associated with the source parameter rule that is specific to the user and/or the client device comprises:
    determining an entity associated with the intent of the audible request;
    determining, based on the intent and the entity both being stored in association with the particular type of request, that the audible request corresponds to the particular type of request that is associated with the source parameter rule that is specific to the user and/or the client device.

5. The method of claim 1, further comprising processing the audible request, using at least one voice recognition technique, to identify an account associated with the user who spoke the audible request.

6. The method of claim 5, wherein determining, based at least in part on the transcription, that the audible request corresponds to the particular type of request that is associated with the source parameter rule that is specific to the user comprises:
identifying, based at least in part on the transcription, an entity associated with the audible request;
identifying a plurality of source parameter rules associated with the account of the user and the entity; and
selecting the source parameter rule, from a plurality of candidate source parameter rules associated with the user, based on one or more answer parameters associated with the account of the user.

7. The method of claim 1, wherein comparing the first content of the one or more preferred results obtained based on the first search of the one or more preferred sources to the second content obtained based on the second search of the plurality of additional sources comprises:
comparing the first content of the one or more preferred results obtained based on the first search of the one or more preferred sources to the second content of a top ranked search result obtained based on the second search of the plurality of additional sources.

8. A method implemented by one or more processors, the method comprising:
training a machine learning model based on training examples generated based on a source parameter rule;
receiving an audible request, of a user, that is captured via one or more microphones of a client device;
processing one or more features of the audible request using the machine learning model to generate output that includes a transcription of the audible request;
determining, based on the output, that the audible request corresponds to a particular type of request that is associated with the source parameter rule that is specific to the user and/or to the client device,
wherein the source parameter rule defines one or more preferred sources to be used in responding to the particular type of request, and is generated based on a previous audible request indicating the particular type of request and the one or more preferred sources to be used in responding to the particular type of request;
causing a search of a plurality of sources to be performed based on the audible request, the plurality of sources including the one or more preferred sources and one or more additional sources, the one or more additional sources not being included in the one or more preferred sources;
identifying results based on the search of the plurality of sources, the results including at least one result corresponding to one or more of the preferred sources and at least one additional result corresponding to one or more of the additional sources;
selecting the at least one result or the at least one additional result for use in generating a response to the audible request;
generating the response to the audible request based on the selected at least one result or the selected at least one additional result; and
causing the response to the audible request to be rendered at the client device, wherein:
when the at least one result is selected, the response includes an indication that the at least one result was selected for providing the response to the audible request based on the source parameter rule, wherein the indication that the at least one result was selected includes natural language content referencing only the one or more preferred sources, and
when the at least one additional result is selected, the response includes an indication that the source parameter rule was violated, wherein the indication that the source parameter rule was violated includes natural language content referencing the one or more of the preferred sources and the one or more of the additional sources.

9. The method of claim 8, wherein generating the response to the audible request includes selecting the at least one result or the at least one additional result for use in generating the response based on:
ranking the results;
comparing a first rank of the at least one additional result corresponding to one or more of the additional sources to a second rank of the at least one result corresponding to one or more of the preferred sources; and
selecting the at least one result or the at least one additional result based at least in part on the comparison.

10. The method of claim 8, wherein the source parameter rule is generated based on a previous audible request indicating the particular type of request and the one or more preferred sources to be used in responding to the particular type of request.

11. The method of claim 8, wherein determining, based at least in part on the transcription, that the audible request corresponds to the particular type of request that is associated with the source parameter rule that is specific to the user and/or to the client device comprises:
performing natural language processing on the transcription to determine an intent of the audible request; and
determining, based on the intent of the audible request being stored in association with the particular type of request, that the audible request corresponds to the particular type of request that is associated with the source parameter rule that is specific to the user and/or the client device.

12. The method of claim 11, wherein determining, based on the intent of the audible request, that the audible request corresponds to the particular type of request that is associated with the source parameter rule that is specific to the user and/or the client device comprises:
determining an entity associated with the intent of the audible request;
determining, based on the intent and the entity both being stored in association with the particular type of request, that the audible request corresponds to the particular type of request that is associated with the source parameter rule that is specific to the user and/or the client device.

13. The method of claim 8, further comprising processing the audible request, using at least one voice recognition technique, to identify an account associated with the user who spoke the audible request.

14. The method of claim 13, wherein determining, based at least in part on the transcription, that the audible request corresponds to the particular type of request that is associated with the source parameter rule that is specific to the user comprises:
identifying, based at least in part on the transcription, an entity associated with the audible request;

identifying a plurality of source parameter rules associated with the account of the user and the entity; and selecting the source parameter rule, from a plurality of candidate source parameter rules associated with the user, based on one or more answer parameters associated with the account of the user.

15. A system comprising:

one or more storage devices storing instructions; and one or more processors that are operable to execute the instructions to cause the one or more processors to:

train a machine learning model based on training examples generated based on a source parameter rule;

receive an audible request, of a user, that is captured via one or more microphones of a client device;

process one or more features of the audible request using the machine learning model to generate output that includes a transcription of the audible request;

determine, based on the output, that the audible request corresponds to a particular type of request that is associated with the source parameter rule that is specific to the user and/or to the client device, wherein the source parameter rule defines one or more preferred sources to be used in responding to the particular type of request, and wherein determining the audible request corresponds to the particular type of request that is associated with the source parameter rule comprises:

identifying a primary source parameter rule from a plurality of candidate parameter rules associated with the user, determining that content associated with a primary source of the primary source parameter rule fails to satisfy information requirements of the user request, and selecting the source parameter rule from the plurality of candidate source parameter rules based on one or more answer parameters, wherein the one or more answer parameters are customized by the user and define which of the plurality of source parameter rules to utilize for responding to the audible request based on the content of the primary source associated with the primary source parameter rule failing to satisfy information requirements of the user request;

cause a first search of the one or more preferred sources to be performed based on the audible request and the source parameter rule;

cause a second search of a plurality of additional sources to be performed based on the audible request and the source parameter rule, the plurality of additional sources not being included in the one or more preferred sources;

compare first content of one or more preferred results obtained based on the first search of the one or more preferred sources to second content of one or more additional results obtained based on the second search of the plurality of additional sources; and based on the comparison indicating at least a threshold degree of dissimilarity between the first content of the one or more preferred results and the second content of the one or more additional results:

generate a response to the audible request, the response including:

at least some of the first content, at least some of the second content, and an indication that the first content obtained from one or more of the preferred sources indicated by the source parameter rule differs from the second content corresponding to one or more of the plurality of the additional sources not indicated by the source parameter rule; and cause the response to the audible request to be rendered at the client device.

16. The system of claim 15, wherein the source parameter rule is generated based on a previous audible request indicating the particular type of request and the one or more preferred sources to be used in responding to the particular type of request.

17. The system of claim 15, wherein determining, based at least in part on the transcription, that the audible request corresponds to the particular type of request that is associated with the source parameter rule that is specific to the user and/or to the client device comprises:

performing natural language processing on the transcription to determine an intent of the audible request; and determining, based on the intent of the audible request being stored in association with the particular type of request, that the audible request corresponds to the particular type of request that is associated with the source parameter rule that is specific to the user and/or the client device.

18. The system of claim 17, wherein determining, based on the intent of the audible request, that the audible request corresponds to the particular type of request that is associated with the source parameter rule that is specific to the user and/or the client device comprises:

determining an entity associated with the intent of the audible request;

determining, based on the intent and the entity both being stored in association with the particular type of request, that the audible request corresponds to the particular type of request that is associated with the source parameter rule that is specific to the user and/or the client device.

* * * * *